(12) United States Patent
Jarroush

(10) Patent No.: US 10,135,800 B2
(45) Date of Patent: Nov. 20, 2018

(54) ELECTRONIC DISCOVERY INSIGHT TOOL

(71) Applicant: Bernard Jarroush, Atlanta, GA (US)

(72) Inventor: Bernard Jarroush, Atlanta, GA (US)

(73) Assignee: Ricoh Company, Ltd., Tokyo (JP)

( * ) Notice: Subject to any disclaimer, the term of this patent is extended or adjusted under 35 U.S.C. 154(b) by 12 days.

(21) Appl. No.: 14/749,609

(22) Filed: Jun. 24, 2015

(65) Prior Publication Data

US 2016/0380990 A1 Dec. 29, 2016

(51) Int. Cl.
| | |
|---|---|
| *G06F 17/00* | (2006.01) |
| *H04L 29/06* | (2006.01) |
| *G06F 3/0484* | (2013.01) |
| *G06F 3/0482* | (2013.01) |
| *G06F 17/30* | (2006.01) |

(52) U.S. Cl.
CPC ............ *H04L 63/08* (2013.01); *G06F 3/0482* (2013.01); *G06F 3/04842* (2013.01); *G06F 17/30011* (2013.01); *G06F 17/30557* (2013.01)

(58) Field of Classification Search
CPC ... G06F 3/0481; G06F 17/2288; G06F 3/0484
USPC .......................... 715/208, 200, 229, 744, 255
See application file for complete search history.

(56) References Cited

U.S. PATENT DOCUMENTS

| | | | |
|---|---|---|---|
| 6,356,908 B1 * | 3/2002 | Brown ............... | G06F 17/30899 |
| 6,810,402 B2 | 10/2004 | Bates | |
| 7,096,218 B2 * | 8/2006 | Schirmer .......... | G06F 17/30648 |
| | | | 707/767 |
| 7,529,804 B1 | 5/2009 | Lu | |
| 7,685,198 B2 * | 3/2010 | Xu ....................... | G06F 17/241 |
| | | | 707/748 |
| 7,788,247 B2 * | 8/2010 | Wang ................. | G06F 17/3089 |
| | | | 707/705 |
| 8,306,966 B2 * | 11/2012 | Liu .................... | G06F 17/30864 |
| | | | 707/707 |
| 8,312,125 B1 | 11/2012 | Rioux | |

(Continued)

OTHER PUBLICATIONS

U.S. Appl. No. 14/749,608, filed Jun. 24, 2015.
U.S. Appl. No. 14/749,607, filed Jun. 24, 2015.
U.S. Appl. No. 14/749,607, filed Jun. 24, 2015, Office Action, dated Nov. 4, 2016.
Jarroush, U.S. Appl. No. 14/749,608, filed Jun. 24, 2015, Final Office Action, dated Jul. 26, 2017.
Jarroush, U.S. Appl. No. 14/749,607, filed Jun. 24, 2015, Interview Summary, dated Jun. 12, 2017.

(Continued)

*Primary Examiner* — Manglesh M Patel
(74) *Attorney, Agent, or Firm* — Hickman Palermo Becker Bingham LLP; Malgorzata A. Kulczycka

(57) ABSTRACT

An electronic discovery insight tool is presented. The tool is implemented in an apparatus comprising one or more processors, one or more memories communicatively coupled to the one or more processors and storing instructions which, when processed by the one or more processors, cause: displaying, on a user display device: an interactive object for selecting one or more data collections, a selectable search object for selecting search functionalities, a selectable report object for selecting report functionalities, and a selectable tag management object for selecting tag management functionalities; receiving, from a user via the interactive object, a selection of a data collection from the one or more data collections; in response to receiving the selection of the data collection: accessing the data collection to make the data collection available a user invoking one or more of: to the search functionalities, the report functionalities, or the tag management functionalities.

20 Claims, 30 Drawing Sheets
(28 of 30 Drawing Sheet(s) Filed in Color)

(56) References Cited

U.S. PATENT DOCUMENTS

| | | | |
|---|---|---|---|
| 9,442,945 B2* | 9/2016 | Goldman | G06T 7/001 |
| 2002/0059395 A1 | 5/2002 | Liou | |
| 2004/0267700 A1 | 12/2004 | Dumais | |
| 2007/0174790 A1* | 7/2007 | Jing | G06F 17/30265 715/838 |
| 2007/0233692 A1 | 10/2007 | Lisa | |
| 2008/0222513 A1 | 9/2008 | Van Den Berge | |
| 2010/0083173 A1 | 4/2010 | Germann | |
| 2013/0117713 A1 | 5/2013 | Bauder | |
| 2013/0212463 A1 | 8/2013 | Pachikov | |
| 2013/0268833 A1 | 10/2013 | Kim | |
| 2014/0324827 A1* | 10/2014 | Hanses | G06F 17/30722 707/722 |
| 2016/0378718 A1 | 12/2016 | Jarroush et al. | |

OTHER PUBLICATIONS

Jarroush, U.S. Appl. No. 14/749,607, filed Jun. 24, 2015, Advisory Action, dated Jun. 23, 2017.
U.S. Appl. No. 14/749,607, filed Jun. 24, 2015, Final Office Action, dated May 3, 2017.
Jarroush, U.S. Appl. No. 14/749,608, filed Jun. 24, 2015, Office Action, dated Mar. 23, 2017.
Sketch, io, Wayback Publication dated Mar. 18, 2015, 3 pages.
U.S. Appl. No. 14/749,608, filed Jun. 24, 2015, Office Action, dated Sep. 22, 2017.
U.S. Appl. No. 14/749,607, filed Jun. 24, 2015, Notice of Allowance, dated Aug. 14, 2017.
Jarroush, U.S. Appl. No. 14/749,608, filed Jun. 24, 2015, Office Action, dated Jun. 28, 2018.

\* cited by examiner

FIG. 17

ELECTRONIC DISCOVERY INSIGHT TOOL

FIELD

Embodiments relate generally to an approach for accessing, bulk tagging, and reporting electronic data and data files, and for customizing the functionalities and graphical user interfaces supporting the accessing, bulk tagging and reporting.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Current approaches for processing electronic documents have significant limitations. For example, conventional systems for processing legal documents require users to have specific knowledge and experience in identifying items that are particularly relevant to legal proceedings and discovery.

Furthermore, many electronic discovery systems offer limited document tagging capabilities. For example, many systems do not allow assigning a tag to an entire logical group of items that have different types and origins.

Moreover, some systems provide limited functionalities for customizing color schemes for displaying data on display devices. For example, many systems disallow a user to change a color scheme used to visualize report data unless the user repeatedly accesses a data repository and repopulates the requested data. All of the above problems can lead to an unsatisfactory or even unacceptable user experience.

SUMMARY

An electronic discovery insight tool is presented. The tool is implemented in an apparatus comprising one or more processors, one or more memories communicatively coupled to the one or more processors and storing instructions which, when processed by the one or more processors, cause: displaying, on a user display device: an interactive object for selecting one or more data collections, a selectable search object for selecting search functionalities, a selectable report object for selecting report functionalities, and a selectable tag management object for selecting tag management functionalities; receiving, from a user via the interactive object, a selection of a data collection from the one or more data collections; in response to receiving the selection of the data collection: accessing the data collection to make the data collection available a user invoking one or more of: to the search functionalities, the report functionalities, or the tag management functionalities.

BRIEF DESCRIPTION OF THE DRAWINGS

The patent or application file contains at least one drawing executed in color. Copies of this patent or patent application publication with color drawing(s) will be provided by the Office upon request and payment of the necessary fee. In the figures of the accompanying drawings like reference numerals refer to similar elements.

FIG. 17 depicts an example graphical user interface generated to view tagged items.

DETAILED DESCRIPTION

Figure 1:
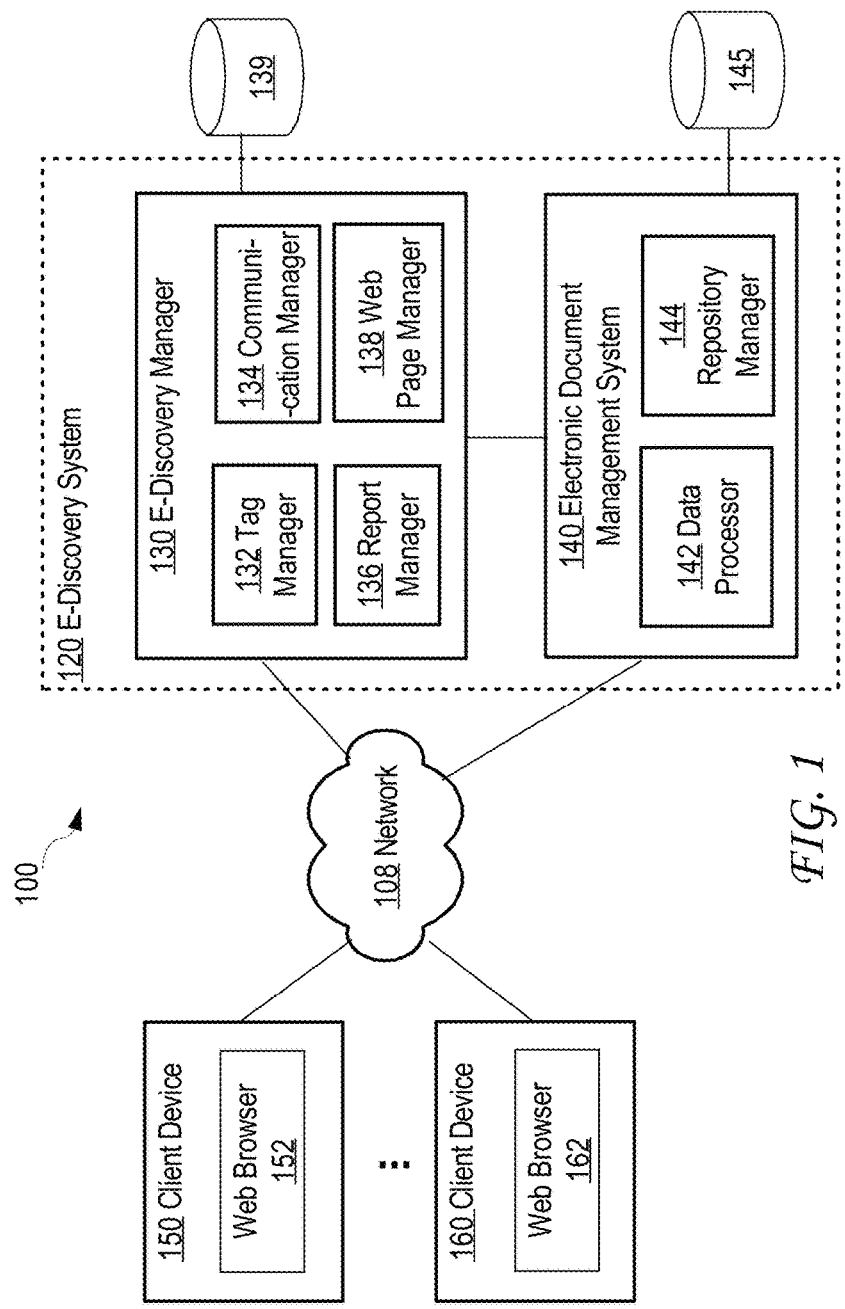
FIG. 1 is a block diagram that depicts an example arrangement for an e-discovery system architecture.

In the following description, for the purposes of explanation, numerous specific details are set forth in order to provide a thorough understanding of the present approach. It will be apparent, however, to one skilled in the art that embodiments may be practiced without these specific details. In other instances, well-known structures and devices are shown in block diagram form in order to avoid unnecessarily obscuring the embodiments. Various embodiments are described hereinafter in the following sections:

I. OVERVIEW
II. DISCOVERY SYSTEM ARCHITECTURE
   A. Electronic Discovery Manager
   B. Electronic Document Management System
   C. Client Device
III. E-DISCOVERY PORTAL
   A. Example E-Discovery Portal
     1. Search Functionalities
     2. Report Functionalities
     3. Tag Management Functionalities
   B. Accessing an Administrator Portal
   C. Functionalities of an Administrator Portal
   D. Accessing a User Portal
   E. Functionalities of a User Portal
IV. BULK TAGGING
   A. Bulk Tagging of Items associated with Email Domains
   B. Exporting Tagged Items
   C. Bulk Tagging of Items Having Certain Attributes
   D. Bulk Tagging of Items Based on File Categories
   E. Bulk Tagging of Items Based on File Types
   F. Tag Management
   G. Adding a Tag
   H. Displaying Tagged Results
   I. Tag Usage
   J. Cost Estimator
V. REPORT CUSTOMIZATION
   A. Dynamic Update of Color Schemes
   B. Dynamic Update of a Dashboard Display
   C. Dynamic Update of a File Category Display
   D. Dynamic Update of a File Type Display
   E. Dynamic Update of a Domain List Report Display
   F. Dynamic Update of a Tag Display
   G. Dynamic Update of a Cost Estimator Display
VI. IMPLEMENTATION MECHANISMS I. Overview An approach is provided for accessing, tagging and reporting electronic data and data files. The approach is implemented in an e-discovery tool and allows customization of the provided functionalities to improve a user's experience.

Various examples of customizing, generating and displaying customized reports based on the collected and tagged data and files included herein are provided merely for the purpose of explanation of some implementations of the approach, and are not to be viewed as limiting the scope of the presented approach.

In an embodiment, an e-discovery tool provides an intuitive navigation experience. For example, the tool provides a separation between available features. The features may be grouped into a group of search features, a group of report features, and a group of tag management features. After a user selects a logical data collection, the user may conveniently access each of the separate groups of features.

Having a separation between the screens simplifies a navigation process and enhances a user's experience. For example, a user does not have to repeat a login process each time he chooses a different group of features. Furthermore, a user may access one type of feature at the time. Therefore, organizations and arrangements of the screens displaying the corresponding features are straightforward and user-friendly.

Users may easily tag items included in data collections. For example, a user may tag a bulk of heterogenic items. A user may assign a tag to a group of items even if the group includes items that have different types or origins. For example, if a user wishes to assign a tag to all items associated with a particular email domain, then the tag will be assigned to all items associated with the particular domain regardless of whether some items are emails, and others are attachments, spreadsheets, documents, image files or audio files. Furthermore, since tags may be assigned to various types of items, users may easily export all the tagged items regardless of their types.

Users may easily generate reports based on data stored in various data collections and repositories. Furthermore, users can easily customize the reports and visual presentations of the reports. Moreover, users can customize the functionalities of the e-discovery tool according to the users' preferences and likings.

II. Discovery System Architecture

FIG. 1 is a block diagram that depicts an example arrangement 100 for an e-discovery system 120 architecture. Embodiments are not limited to the example arrangement 100 depicted in FIG. 1, and other example arrangements are described hereinafter.

Example arrangement 100 may be implemented in one or more computer systems configured to perform any type of electronic data processing. The computers systems may include any type of electronic devices configured to facilitate accessing, storing, requesting, retrieving and/or processing electronic data. Non-limiting examples of the computer systems on which arrangement 100 may be implemented may include computer servers, database servers, personal computers, laptop computers, workstations, table computers, and the like. The examples included herein are provided merely for the purpose of explanation of some implementations of example arrangement 100, and are not to be viewed as limiting the implementation scope of arrangement 100.

In the depicted example, e-discovery system 120 comprises an e-discovery manager 130 and an electronic document management system 140. E-discovery system 120 is communicatively coupled to one or more communications networks 108 and one or more data storage devices 139, 145. E-discovery system 120 may communicate with one or more client devices 150, 160. E-discovery system 120 may communicate with some of the clients directly, or with some of the clients via communications network 180, as depicted in FIG. 1.

Example arrangement 100 may include various types of communications links used to facilitate communications between e-discovery manager 130, electronic document management system 140, network storage devices 139, 145, network 108, client devices 150. 160, and other components not depicted in FIG. 1.

Network storage devices 139, 145 are computer-based systems configured to store electronic data. Network storage devices 139, 145 may be implemented in one or more computing devices configured to store data and data files on one or more servers. For example, network storage devices 139, 145 may be implemented in devices such as magnetic disks, optical disks, and the like.

Network storage devices 139, 145 may be configured to store information received from e-discovery system 120, and client devices 150, 160. Furthermore, network storage devices 139, 145 may be configured to make the stored information available to any of the above elements.

Network storage devices 139, 145 may be implemented in any type of servers and may be managed by any type of entity. For example, network storage devices 139, 145 may be implemented as a cloud service.

A. Electronic Discovery Manager

E-discovery manager 130 may be configured to request, tag and otherwise process data stored in various repositories. For example, e-discovery manager 130 may be configured to process requests to access data collected by electronic document management system 140. E-discovery manager 130 may also facilitate data tagging and generating reports based on the tagged data. Furthermore, e-discovery manager 130 may be configured to facilitate customization of the tags, the reports, and visual representations of the reports.

E-discovery manager 130 may be implemented in a standalone device or in a distributed system. In an embodiment, e-discovery manager 130 comprises one or more components. For example, e-discovery manager 130 may comprise a tag manager 132, a communications manager 134, a report manager 136 and a web page manager 138. In other implementations, e-discovery manager 130 may comprise some of the components 132-138 and/or other components not described herein.

Tag manager 132 may be configured to manage tags associated with items. That may include providing functionalities for creating tags, assigning tags to various items, deleting tags, customizing tags, and the like.

Communications manager 134 may be configured to provide interface capability to e-discovery system 120. For example, communications manager 134 may provide functionalities for accessing e-discovery system 120, transmitting requests and data to and from e-discovery system 120, transmitting web page contents to client devices 150, 160, and the like.

Report manager 136 may be configured to generate and customize reports. That may include providing functionalities for accessing logical data collections, retrieving data from collections, applying filters to retrieved data, applying customization requirements to retrieved data, and the like.

Web page manager 138 may be configured to generate contents of web pages provided to client devices 150, 160. Web page manager 138 may also be configured to generate visual representations of reports and to apply customization requirements to the visual representations.

B. Electronic Document Management System

Electronic document management system 140 may be configured to collect electronic data and electronic data files from various sources. The data and the files may be collected from, for example, one or more network storage devices 139, 145, and/or one or more client devices 150, 160. Electronic document management system 140 may be configured to perform specialized searches of items stored on target computers, storage devices and user computers.

Depending on implementation, electronic document management system 140 may be configured as a standalone system or as distributed system. It may comprise various modules and components. For example, electronic document management system 140 may comprise one or more data processors 142 configured to execute instructions for communicating with a repository manager 144. Repository manager 144 may be configured to manage collecting, accessing, storing and retrieving electronic data from the repositories.

C. Client Device

Client devices 150, 160 are computer-based-systems that users use to access, tag and otherwise process electronic data. Users may also use client devices 150, 160 to request reports, customize reports, customize tags, and provide various customization requirements to e-discovery system 120.

Client devices 150, 160 may be any type of devices. The type of client devices 150, 160 depends upon the implementation. Examples of client devices include, without limitation, personal computers, laptop computers, workstations, tablet computers, personal digital assistants (PDAs), and telephony devices such as smart phones.

Client devices 150, 160 may provide functionalities implemented by hardware, computer software, or any combination of hardware and computer software.

Client devices 150, 160 may have installed applications such as web browsers, data processing applications, and other client-side applications. Client devices 150, 160 may include other elements, such as user interfaces, one or more processors and memory units, including volatile memory and non-volatile memory.

In an embodiment, client devices 150, 160 are computer-based-systems implemented in mobile devices. For example, client device 150, 160 may be implemented in a mobile device such as a smart phone, a tablet, a portable computer, and the like. A user of the mobile device may invoke an application installed on the mobile device and use the application to requests collecting, retrieving, tagging and reporting electronic data and data files. A user of the mobile device may also customize the manner in which reports are presented for the user. Furthermore, a user may create tags, delete tags, assign tags to items, reassign tags to items, and customize tags associated with items.

Users may access, from their client devices 150, 160, the corresponding web browsers 152, 162. Users may use the browsers to request access to e-discovery system 120. The types of access granted to a user depends on the access credentials provided by the user. For example, if a user provides valid credentials of an administrator, then the user may be able to access an e-discovery application view (or a portal) that is customized for the administrator. Such a portal may provide functionalities that are available not only to all types of users, but also functionalities that are available only to the administrator.

However, if a user provides valid credentials of a non-administrator, then the user may be able to access an e-discovery application view (or a portal) that is customized for the user. Such a portal may provide functionalities that are available to the user, but probably not the functionalities that are available only to an administrator.

Users may request electronic data and/or electronic data files from electronic document management system 140 and/or from data storage device 139, 145. Users may specify the types of data and files to be retrieved. For example, the users may specify one or more individual files or documents to be retrieved from electronic document management system 140. Examples may include requesting one or more items associated with certain email domains, and the like.

Users may assign tags to items. Tags may be assigned to the items that already have some tags assigned to them, and/or to the items that do not have any assigned tags.

Tags may be defined in a variety of ways. For example, a tag may be identified by a name. A tag may also be identified by a color, and/or a set of attributes. A tag name may be represented using alphanumeric strings, and the color may be represented using color attributes.

Users may create, modify and/or delete tags by creating, modifying and/or deleting the names and the color-coding of the tags. Users may assign tags to items, and the items may be associated with various domains, repositories, databases, and the like.

Users may request generating reports based on tagged data. For example, a user may request displaying all items that have been tagged with a particular tag. A user may also request displaying all items that have been tagged with a particular tag and that have been associated with certain email domains.

Users may customize reports. For example, a user may provide report customization settings and request using the provided settings to customize reports generated for the user. The settings may include the settings for a background skin image or a background color, the settings for color schemes used to graphically represent requested data, the settings for arrangements of objects depicting the requested data, and the like. If a user changes customization settings for one report, the changes may be reflected in other user's reports.

Users may customize tags. For example, a user may provide tag customization settings, and request using the provided settings to customize tags used by the user. For example, a user may provide settings for colors to be associated with the tags, settings for color schemes to be associated with a group of tags, and the like.

E-discovery system 120 may be configured to save customization settings provided by a user. The settings may be saved in a user profile or a customization file associated with the user profile. The customization settings may be used to customize tags and reports. The settings may also be used to customize visual representations of tags, visual representation of reports, and the like.

III. E-Discovery Portal

In an embodiment, e-discovery tool is configured to provide a web-based portal for a user. A portal may be configured to provide access to the e-discovery tool and to enable access to the functionalities and features provided by the tool. The portal may be designed in a variety of ways, and the specific organization of the portal depends on the implementation.

An e-discovery portal usually includes an interactive object that allows a user to select a logical data collection from a set of collections. The portal may also include one or more other objects that allow the user to navigate the functionalities of the tool. The other objects are usually accessible to the user once the user selects the logical data collection from the set of collections. The other objects may include a search object for accessing search functionalities, a report object for accessing report functionalities, a tag object for accessing tag management functionalities, and the like. For example, once a user selects a particular collection, the user may select a search object, and thus obtain access to the search functionalities.

In an embodiment, a user first selects a logical data collection from a set of collections. Once a particular data collection is selected, the user may select other objects, and that may lead the user to searching, reporting or tagging functionalities. This approach is different from conventional approaches in which the user usually first selects the functionalities, and then selects a data collection. Using the presented approach, a user does not have to select a data collection each time the user selects different functionalities.

In an embodiment, an e-discovery portal organization provides many benefits that are not available in conventional discovery systems. For example, using the portal described herein, a user may take an advantage of various functionalities without repeatedly requesting access to the same data collection. For example, once a user selects a data collection, the user may switch back and forth between different types of functionalities without requesting access to the same data collection again.

Another benefit of the e-discovery portal organization described herein is a separation between search functionalities, report functionalities and tag management functionalities. Each type of the functionalities is presented on a user display device in a separate screen. For example, once a user selects a particular logical data collection and then an object corresponding to the search capabilities, the system may display a screen that includes graphical objects specific to the search functionalities applicable to the particular collection. In addition, the system may display tabs corresponding to the remaining functionalities, such as report functionalities and tag management functionalities. Using the tabs, the user may conveniently switch between different types of functionalities that are applicable to the same particular collection. Using this approach, a user does not need to log into a web page that contains all types of functionalities, and thus is most likely congested with various objects and icons corresponding to different types of functionalities.

A. Example E-Discovery Portal

In an embodiment, e-discovery portal for accessing an e-discovery tool is implemented in a graphical user interface.

Figure 2:
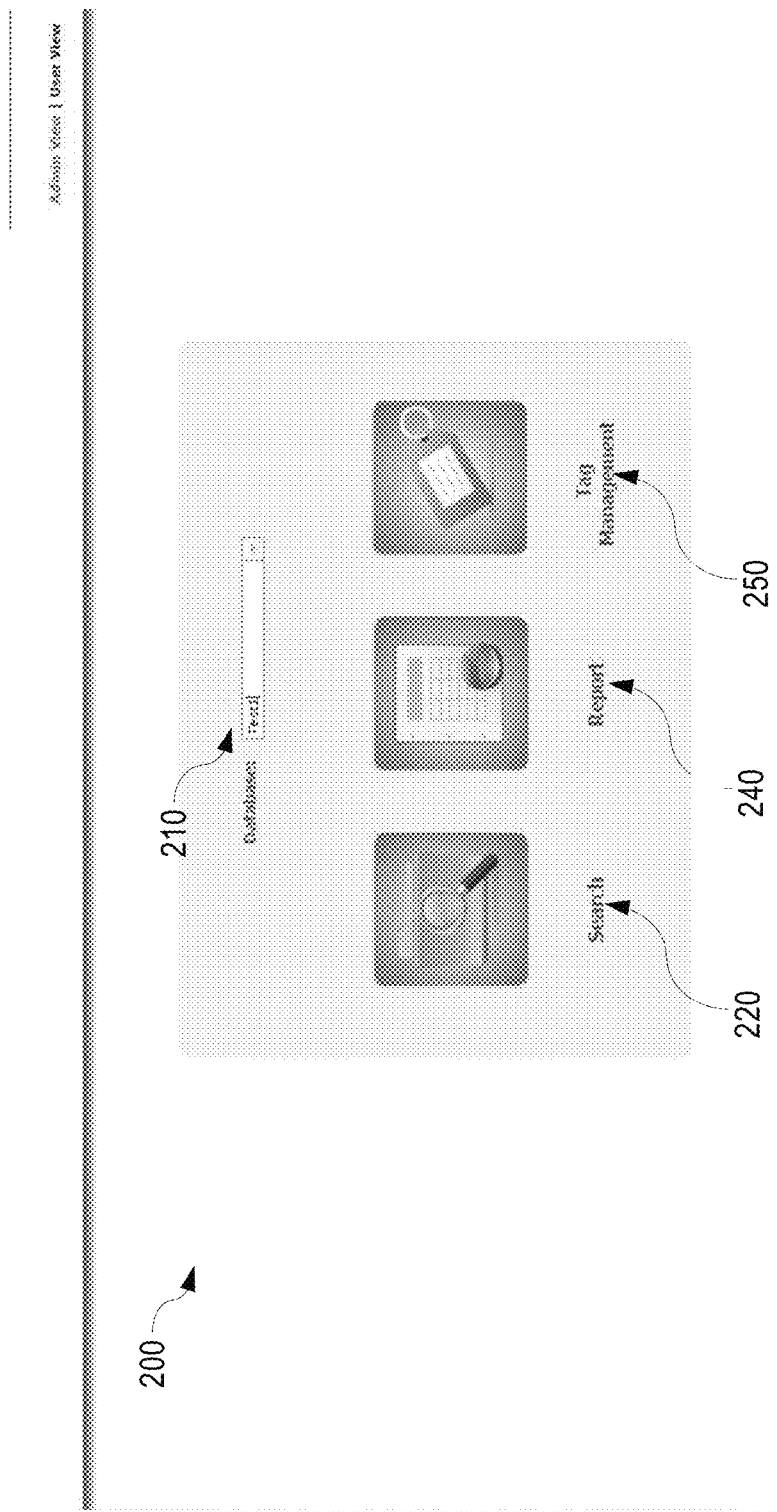
FIG. 2 is an example graphical user interface facilitating access to an e-discovery tool.

FIG. 2 is an example graphical user interface (GUI) 200 facilitating access to an e-discovery tool. The example depicted in FIG. 2 is provided merely to illustrate one of many possible implementations of the GUI 200.

In the depicted example, GUI 200 is displayed on a user display device. The GUI 200 includes various interactive objects. GUI 200 depicted in FIG. 2, includes an interactive object 210 for selecting one or more data collections, a selectable search object 220 for selecting search functionalities, a selectable report object 240 for selecting report functionalities, and a selectable tag management object 250 for selecting tag management functionalities.

Interactive object 210 is displayed on GUI 200 to allow the user to select one or more data collections. A data collection may be any type of group that includes various documents, files, images, and other items that in some sense are related to each other. For example, a group may include various documents, files and images that are related to a particular legal proceedings. A group of items may be referred to as a logical data collection.

Data collections available via interactive object 210 may comprise one or more logical data collections, and each logical data collection may be associated with one or more of: a database, a case, a project, or search results.

Interactive object 210 may be implemented in a variety of ways. For example, interactive object 210 may be implemented as a pull-up menu that includes one or more choices of data collections. A user may select a data collection from the available choices. In other implementations, a user may browse a directory content and select a data collection from the directory of collections.

Search object 220 may represent all search functionalizes that are available to a user and are applicable to a logical data collection selected by the user. Once a user selects search object 220, the system may generate a web page that may include various objects and icons representing the search functionalities.

As a user proceeds with a search against data in a logical data collection, a search history may be generated and stored for the user. For example, as a user specifies a particular search, settings, keywords and/or requirements specific to a particular search, the search history may be saved and may be made available to the user for future references.

Report object 240 may represent all report functionalities that are available to a user and are applicable to a logical data collection selected by the user. The report functionalities may allow a user to generate various types of reports based on data included in a logical collection. Once a user selects the logical collection and then report object 240, the system may generate a web page that may include various objects and icons representing various ways for specifying and customizing reports.

Tag management object 250 may represent all tag management functionalities that are available to a user and are applicable to a logical data collection selected by the user. Tag management functionalities may include functionalities that allow a user to manage tags that have been already created, add new tags, delete some of the existing tags, reassign the tags to items, and the like.

In an embodiment, once GUI 200 is displayed on a user display device, a user may select a logical data collection using interactive object 210. Until the user selects one of the logical data collections, other objects, such as search object 220, report object 240 and tag management object 250 may remain inaccessible to the user.

Upon receiving, from a user via interactive object 210, a selection of a data collection from the one or more data collections, other objects, such as search object 220, report object 240 and tag management object 250 may become accessible to the user. At this point, a user may select any of search object 220, report object 240 or tag management object 250. By selecting any of search object 220, report object 240 or tag management object 250, the already selected data collection may become available to search functionalities, report functionalities, and/or tag management functionalities, respectively.

1. Search Functionalities

Figure 3:
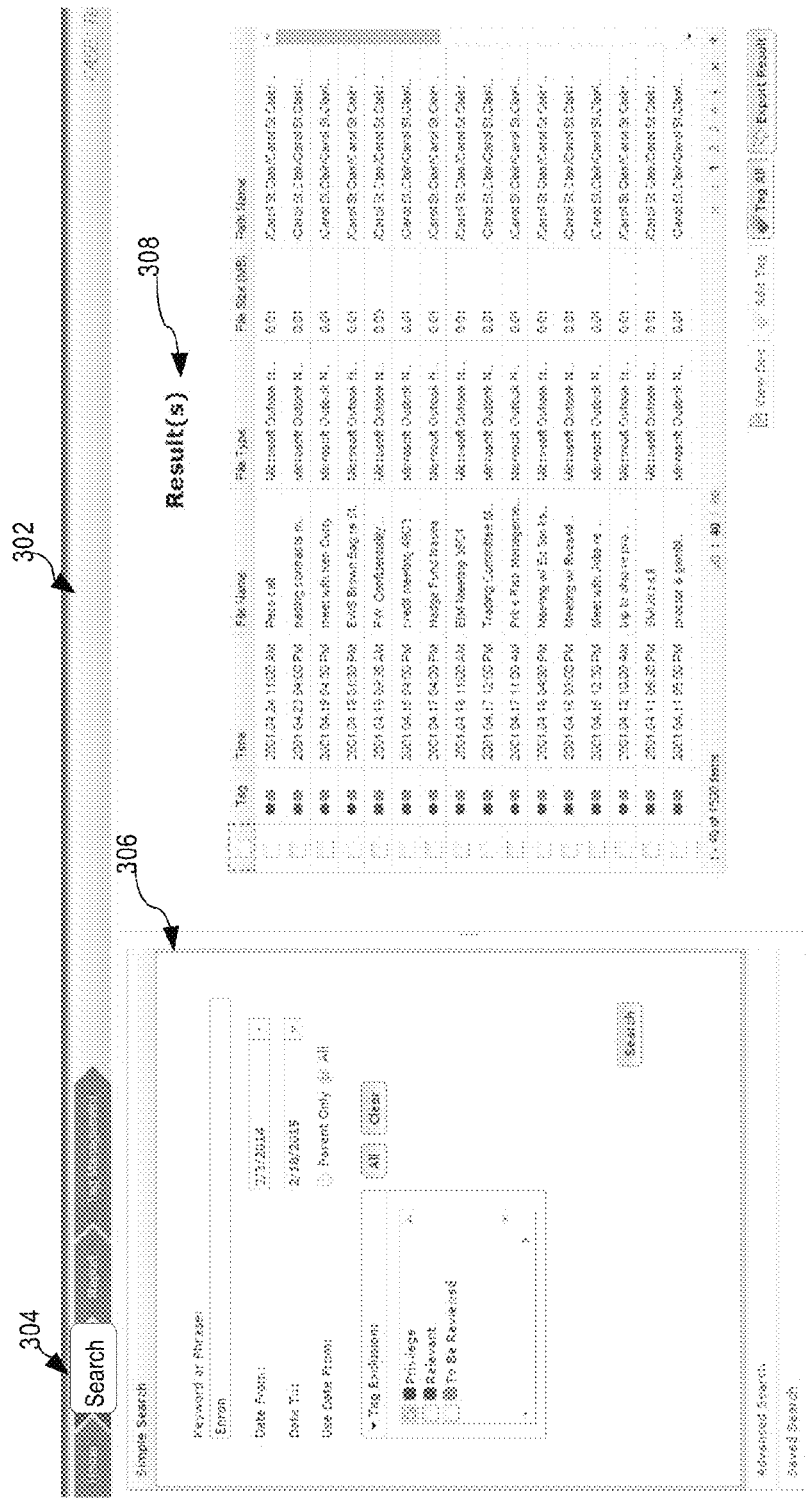
FIG. 3 is an example graphical user interface for accessing search functionalities.

FIG. 3 is an example graphical user interface 302 for accessing search functionalities.

If a user selects search object 220 (depicted in FIG. 2), then graphical user interface (GUI) 302 may be generated and displayed for the user. GUI 302 may include various tabs, including a search tab 304. GUI 302 may also include a simple search menu 306 that a user may use to customize a search query to be executed on a data collection. Once a user specifies the search query, the system may generate one or more search results for the query, and display the search results in a result portion 308 of GUI 302.

A search menu displayed for a user may be simple and may include one or more options for customizing a search query. For example, a simple menu may allow specifying one or more keywords, one or more tags, a time window for items, and the like. An example of a simple menu is search menu 306 depicted in FIG. 2. A search menu may also be a complex menu. Such a menu may include more options than a simple menu and may allow a detailed customization of a search query. An example of a complex menu is depicted in FIG. 4.

Figure 4:
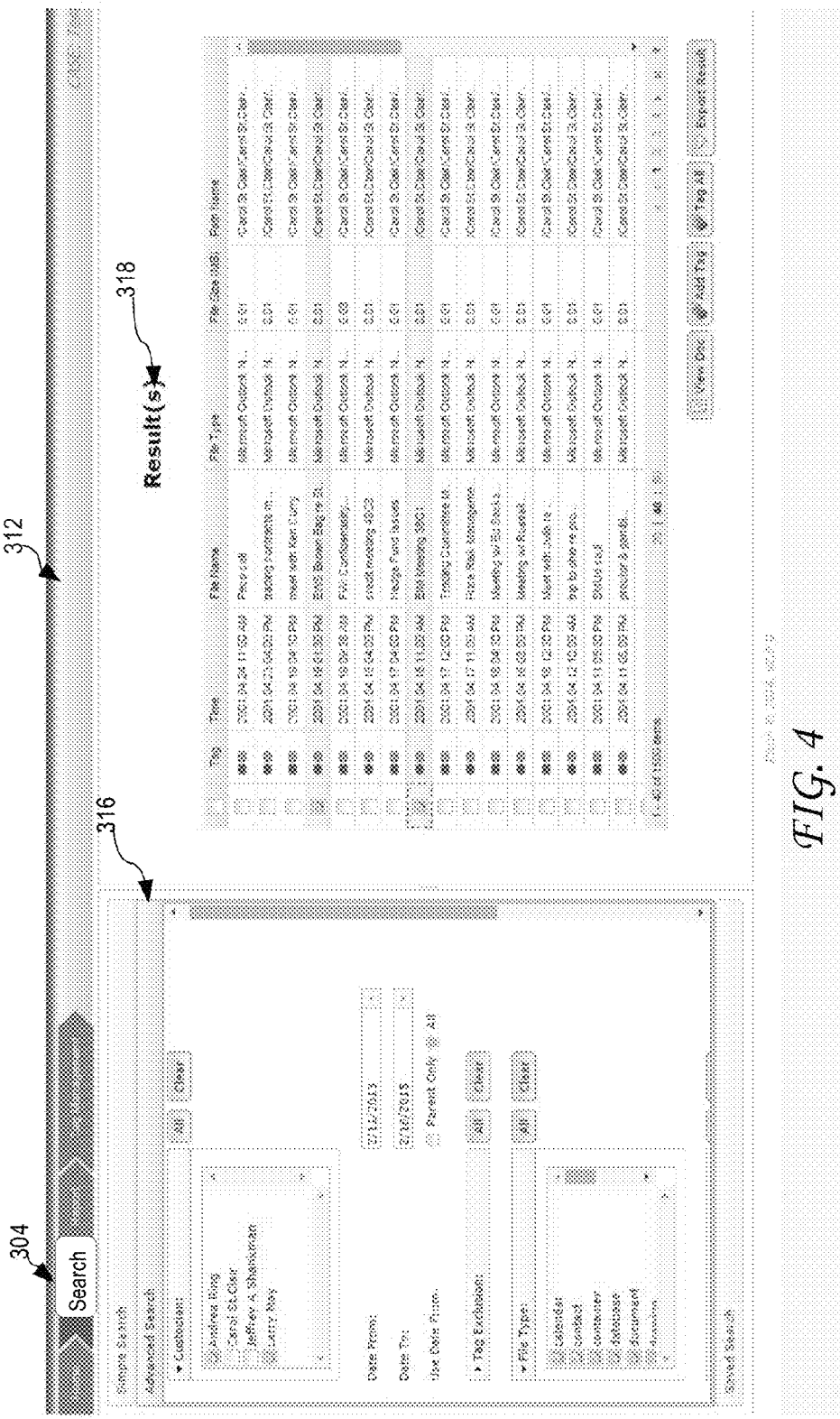
FIG. 4 is an example graphical user interface for accessing search functionalities.

FIG. 4 is an example graphical user interface 312 for accessing search functionalities. If a user selects search object 220 (depicted in FIG. 2), then graphical user interface (GUI) 312 may be generated and displayed for the user. GUI 312 may include various tabs, including a search tab 304. GUI 312 may also include a search menu 316 that a user may use to customize a search query to be executed on a data collection. Once a user specifies the search query, the system may generate one or more search results for the query, and display the search results in a result portion 318 of GUI 312.

Search menu 316 is slightly more complex than search menu 306. While simple search menu 306 allows specifying one or more keywords, one or more tags, a time window for items, and the like, more complex search menu 316 allows also specifying a custodian who owns the items to be returned in the search results, type files of the files to be returned in the search results, type extensions of the files returned in the search results, and the like.

2. Report Functionalities

Figure 5:
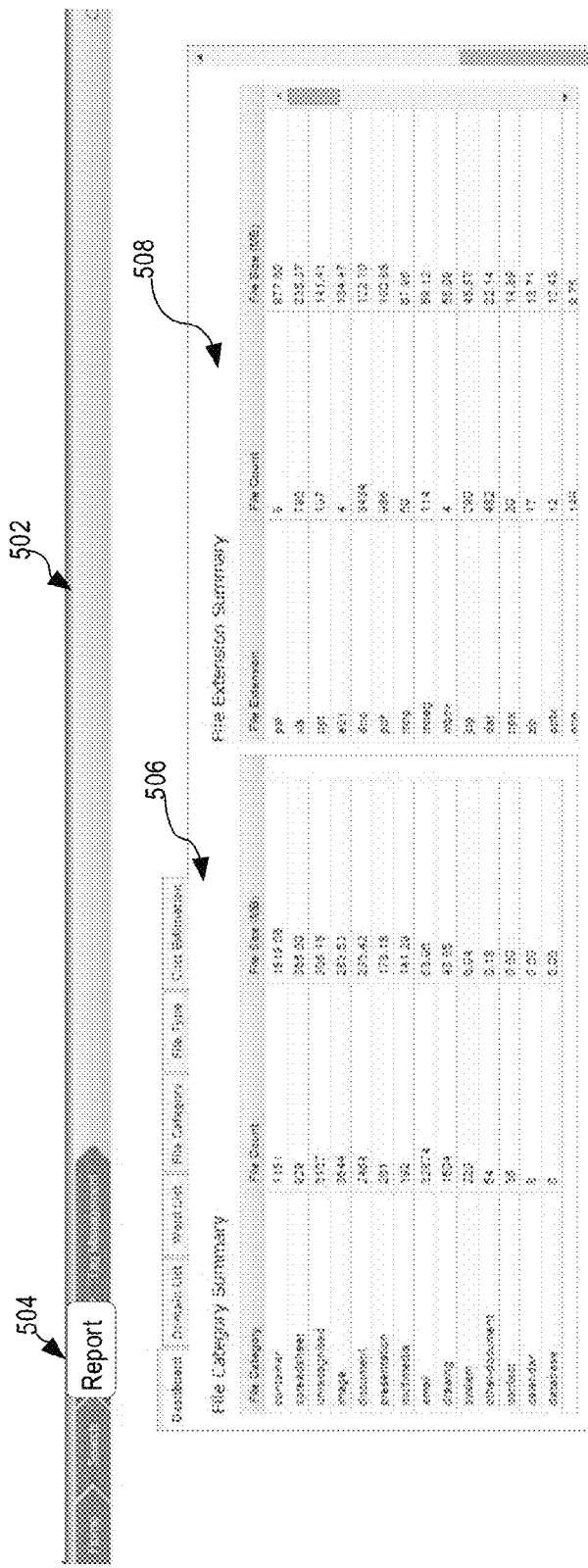
FIG. 5 is an example graphical user interface for accessing report functionalities.

FIG. 5 is an example graphical user interface 502 for accessing report functionalities.

If a user selects report object 240 (depicted in FIG. 2), then graphical user interface (GUI) 502 may be generated and displayed for the user. GUI 502 may include various tabs, including a report tab 504. Assuming that a user has already specified a search query and received search results, the system may generate report data based on the search results and generate a visual representation of the report data. The visual representation of the report data may be depicted in GUI 502. In FIG. 5, the report data are visually represented in a file category summary 506 and a file extension summary 508. The summaries are described in detail below. These are just two examples of many visual representations of report data.

Figure 6:
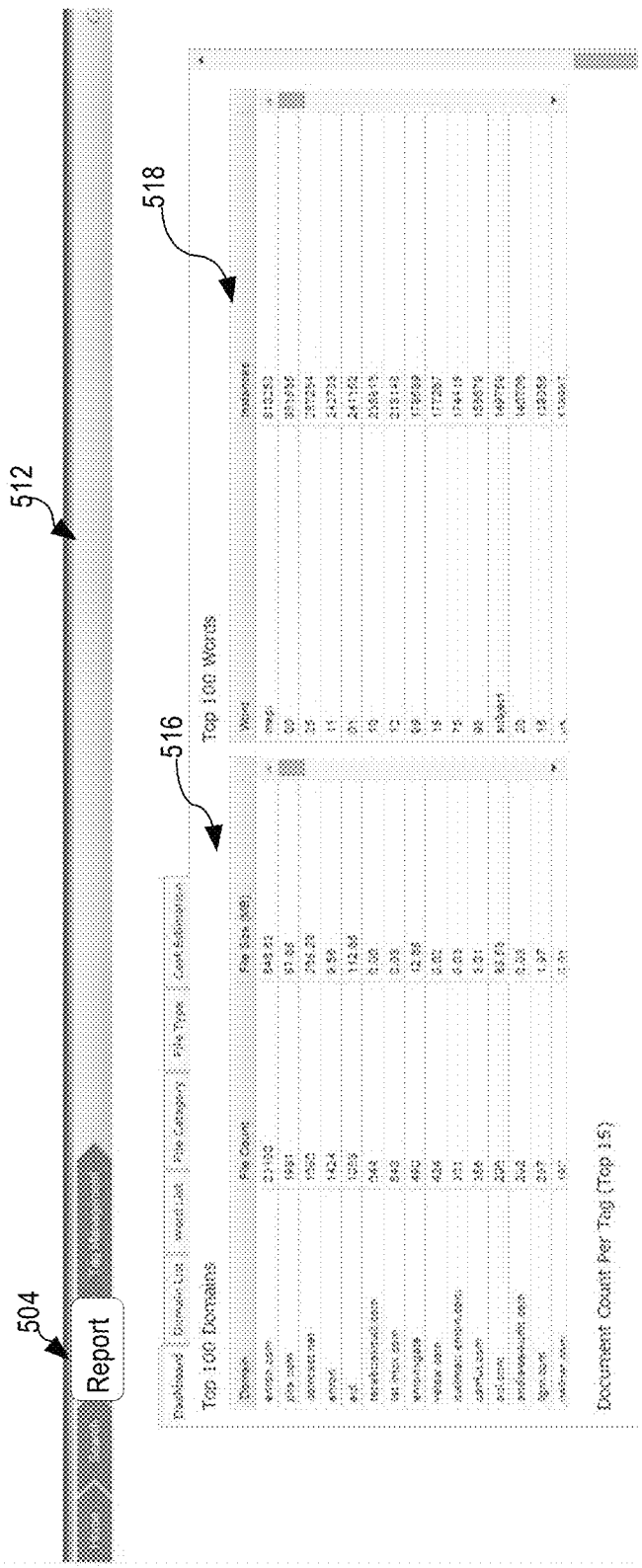
FIG. 6 is an example graphical user interface for accessing report functionalities.

FIG. 6 is an example graphical user interface 512 for accessing report functionalities. If a user selects report object 240 (depicted in FIG. 2), then graphical user interface (GUI) 512 may be generated and displayed for the user. GUI 512 may include various tabs, including a report tab 504. Assuming that a user has already specified a search query and received search results, the system may generate report data based on the search results and generate a visual representation of the report data. The visual representation of the report data may be depicted in GUI 512. In FIG. 6, the report data are visually represented in a top 100 domains summary 516 and a top 100 words summary 518. The summaries are described in detail below. Other types of visual representations of report data are also described below.

3. Tag Management Functionalities

Figure 7:
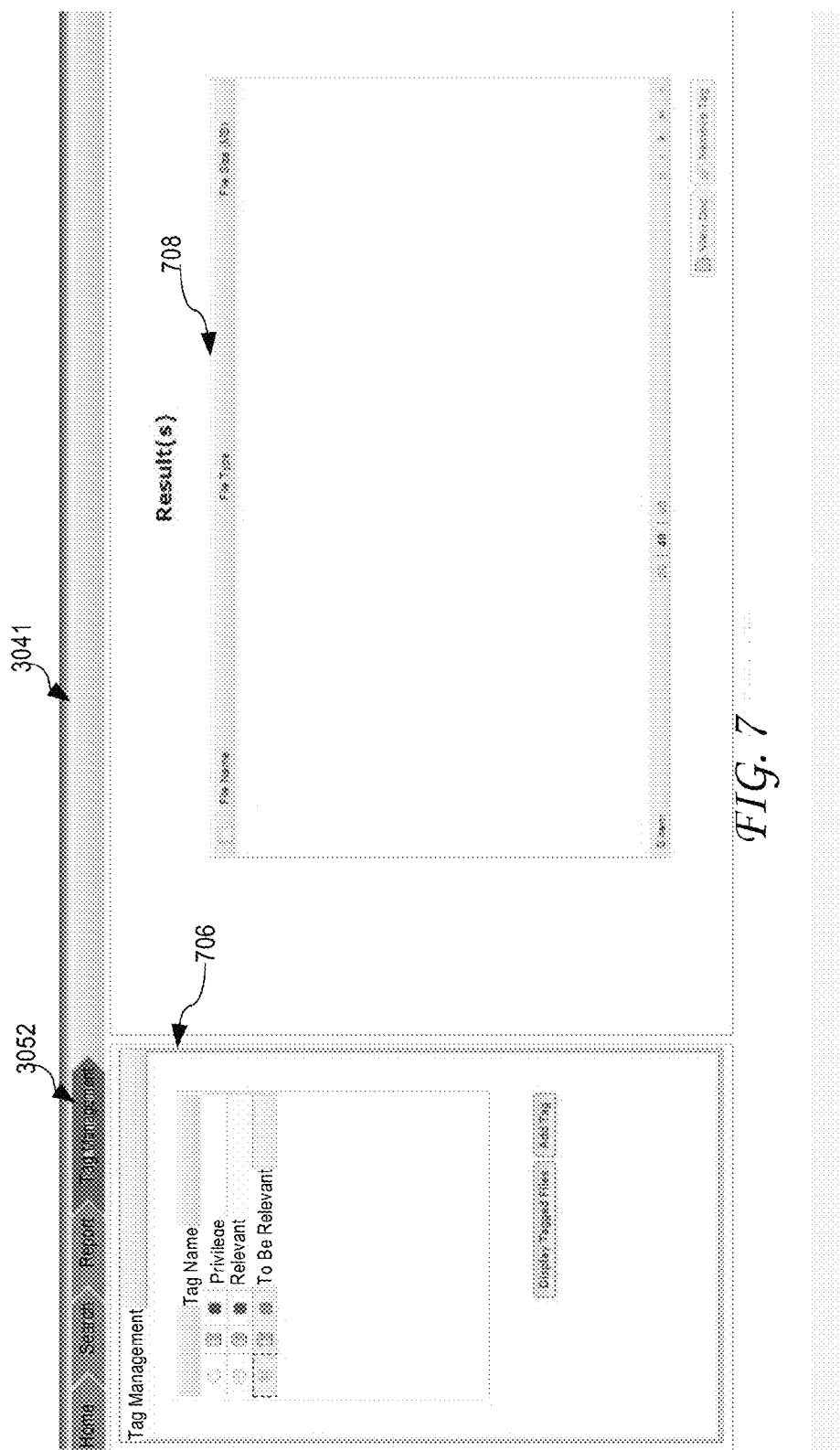
FIG. 7 is an example graphical user interface for accessing tag management functionalities.

FIG. 7 is an example graphical user interface 3041 for accessing tag management functionalities. If a user selects tag management object 250 (depicted in FIG. 2), then graphical user interface (GUI) 3041 may be generated and displayed for the user. GUI 3041 may include various tabs, including a tag management tab 3052. Assuming that a user has already created one or more tags, the system may generate a visual representation of the tags. The visual representation of the tags may be depicted in GUI 3041. In FIG. 6, the tags are visually represented in a tag summary 706. Tagged items (if such are present) may be visually represented in an item summary 708. The summaries and more complex examples are described in detail below.

Figure 8:
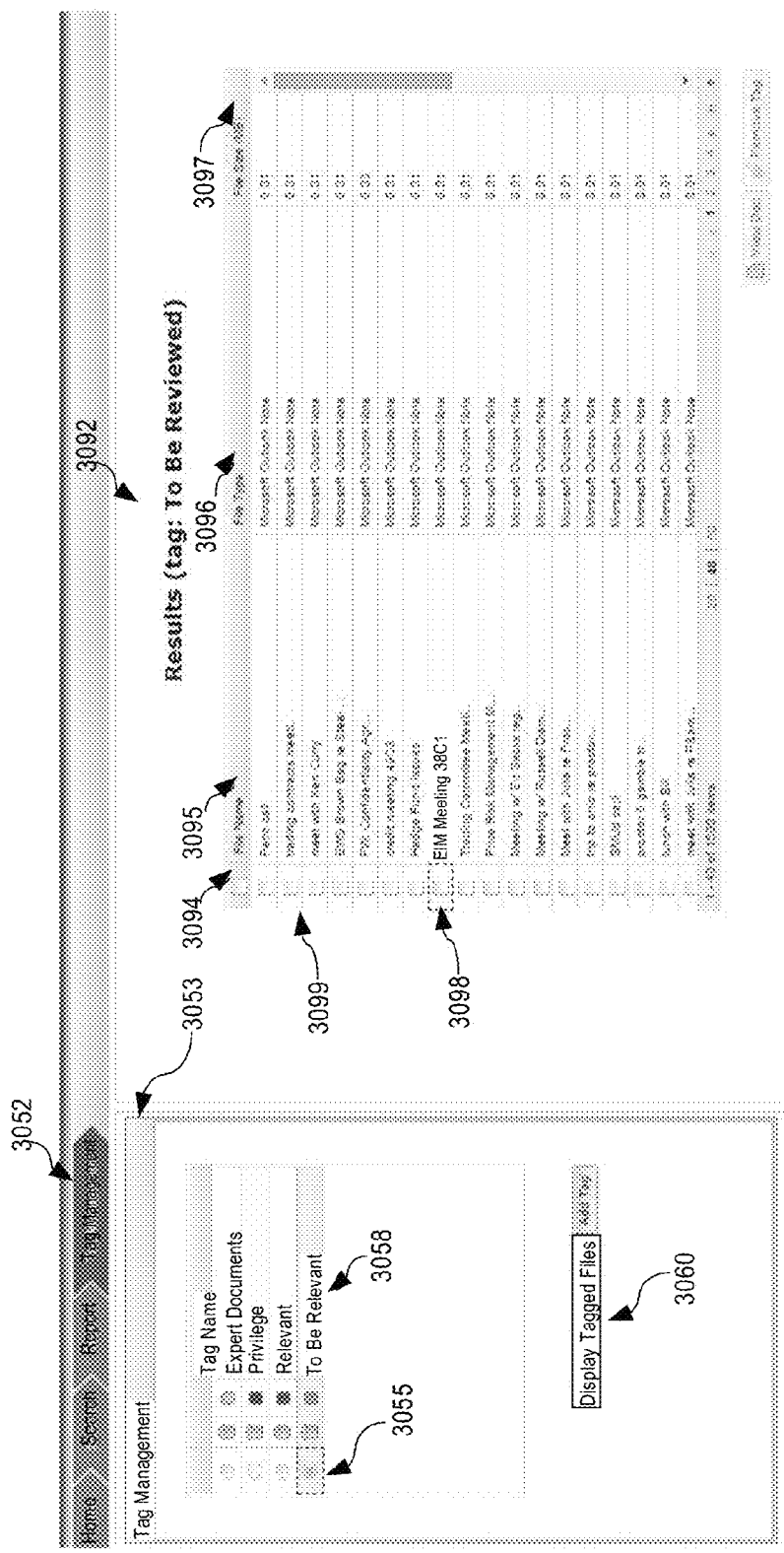
FIG. 8 is an example graphical user interface for accessing tag management functionalities.

FIG. 8 is an example graphical user interface 3092 for accessing tag management functionalities. Once a user selected tag management object 250, the system displays a tag management tab 3052 and a tag management window 3053. Tag management window 3053 may include a tag name column in which the names of already existing tags are included. In the depicted example, the following tags have been already created: an "expert documents" tag, a "privilege" tag, a "relevant" tag, and a "to be relevant" tag.

Next to the tag names, one or more objects (icons) may be displayed to allow an administrator or a user to select tags, delete tags, color-code tags, and so forth. For example, by selecting an icon 3055 displayed next to "to be relevant" tag 3058, the administrator may select the tag 3058. Furthermore, a user may select an object called a display tagged files 3060 to request displaying the files that have been already tagged with the selected tags. The results may be displayed in a result area 3099 of graphical user interface 3092.

Graphical representation of result area 3099 and object arrangements within result area 3099 may depend on the implementation. In the depicted example, result area 3099 contains rows of data that correspond to items that are tagged with "to be relevant" tag 3058. The items may include information about email domains, information about files, information about documents, and the like, that have been tagged with "to be relevant" tag 3058.

In an embodiment, result area 3099 includes rows of data corresponding to files that have been tagged with "to be relevant" tag 3083. Each row has a column labeled as a row selector 3094, a file name column 3095, a file type column 3096, and a file size column 3097. A use may select a particular row in result area 3099 by selecting a particular indicator 3098 in row selector 3094. Other arrangements of the display may also be implemented. Additional tag management functionalities are described in sections below.

B. Accessing an Administrator Portal

In an embodiment, access to the functionalities is granted once a user provides valid credentials.

Figure 9:
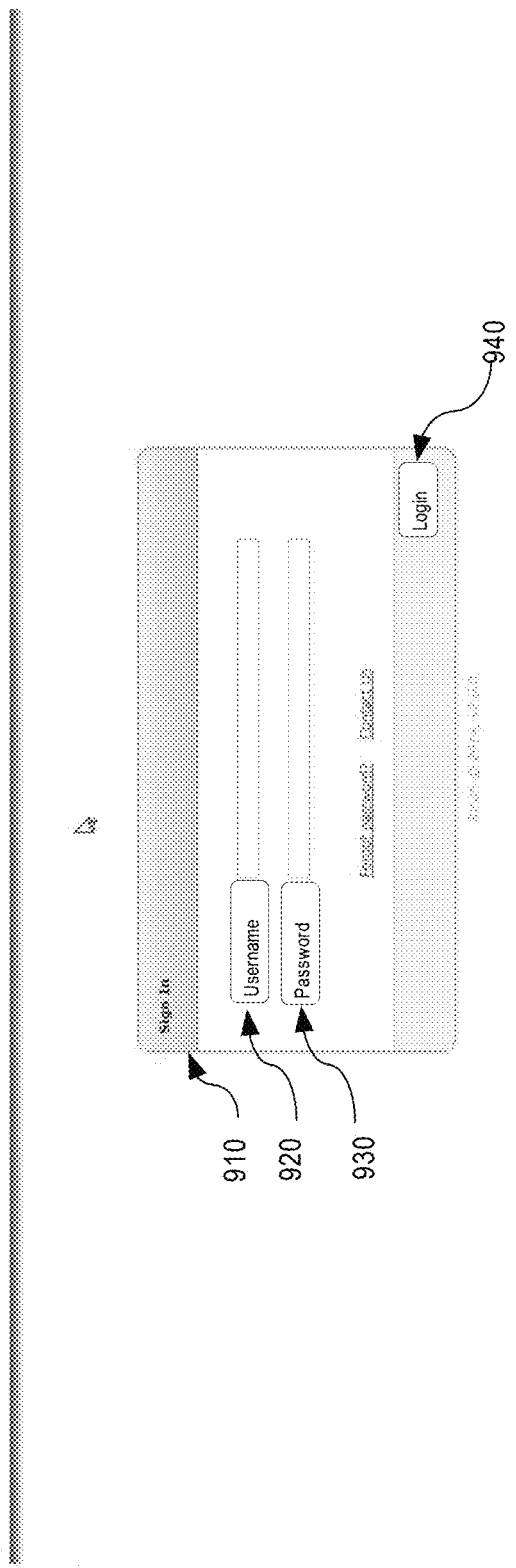
FIG. 9 is an example graphical user interface for providing user credentials.

FIG. 9 is an example graphical user interface for providing user credentials. In an embodiment, user credentials are provided prior to displaying GUI 200 of FIG. 2. Hence a user provides the credentials prior to seeing interactive object 210, selectable search object 220, selectable report object 240, and selectable tag management object 250.

A user may be any type of user that can be granted access to e-discovery tool. For example, a user may be a system administrator or any other user who is not an administrator. An administrator usually has more privileges than a non-administrator, and thus an administrator usually has access to a broader scope of functionalities of the e-discovery tool then a non-administrator.

In an embodiment, one or more input credential objects for providing user credentials are displayed for a user. Input credential objects may include various arrangements of icons, text boxes, and the like. For example, the input credential objects may include a sign-in object 910, which may comprise a username input text box 920 for providing a username, a password text box 930 for providing a password, and a login selector for sending the username and the password for validation.

Upon receiving, from a user via input credential object 910, particular user credentials, the credentials are validated. If the credentials are valid, then it is determined if the credentials correspond to credentials of an administrator or credentials of a user.

In response to determining that the credentials are valid and correspond to credentials of an administrator, functionalities are customized to include those search functionalities, report functionalities and tag management functionalities that may be available to a system administrator. Usually a system administrator is granted more advanced privileges than other users, and thus the functionalities that are available to the system administrator may include some functionalities that are not available to the other users.

In response to determining that the credentials are valid and correspond to credentials of a non-administrator, functionalities are customized to include those that are available to users, but not to an administrator.

C. Functionalities of an Administrator Portal

Figure 10:
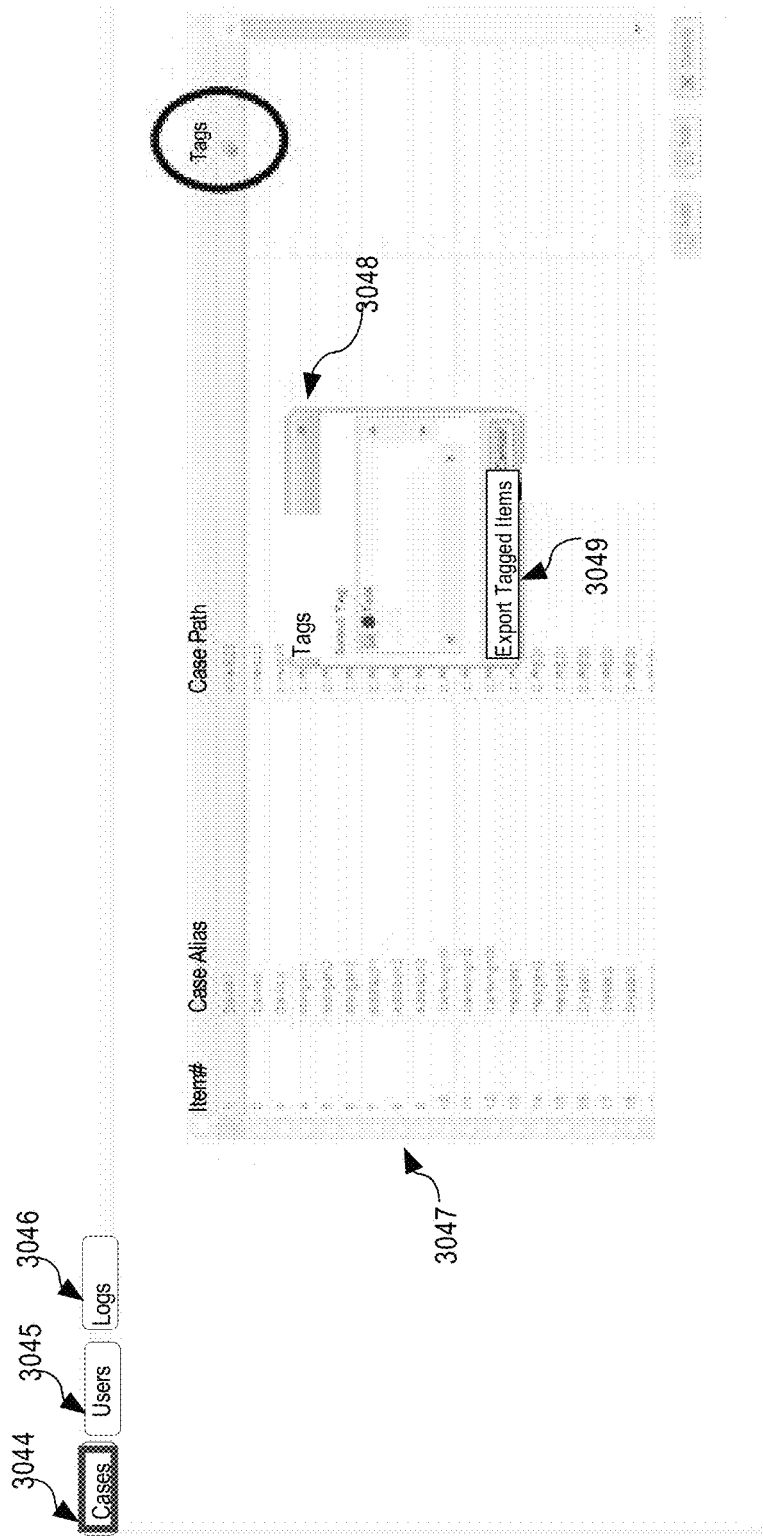
FIG. 10 is an example graphical user interface displayed for a system administrator.

FIG. 10 is an example graphical user interface displayed for a system administrator. The example depicted in FIG. 10 is one of many portals that are available to an administrator. In the depicted example, a graphical user interface is generated to enable exporting all documents related to a specific tag. A system administrator may select the manner in which result data included in a report are to be presented. In the depicted example, the administrator may choose between selecting the result data organized by cases, by users and by logs. For example, to have the result data organized by the cases, the administrator may select a cases tab 3044. To have the result data organized by the users, the administrator may select a user tab 3045. To have the result data organized by the logs, the administrator may select a log tab 3046.

Once an administrator selects the manner in which result data is to be presented, the system displays the result data according to the administrator's specifications. For example, if the administrator selected cases tab 3044, then the result data may be organized by a case identifier and displayed in a display area 3047.

Furthermore, an administrator may be provided with an overlay tag window 3048. Overlay tag window 3048 may be used to display one or more tags. An export tagged items selector 3049 may be used to request exporting of the tagged items.

Figure 11:
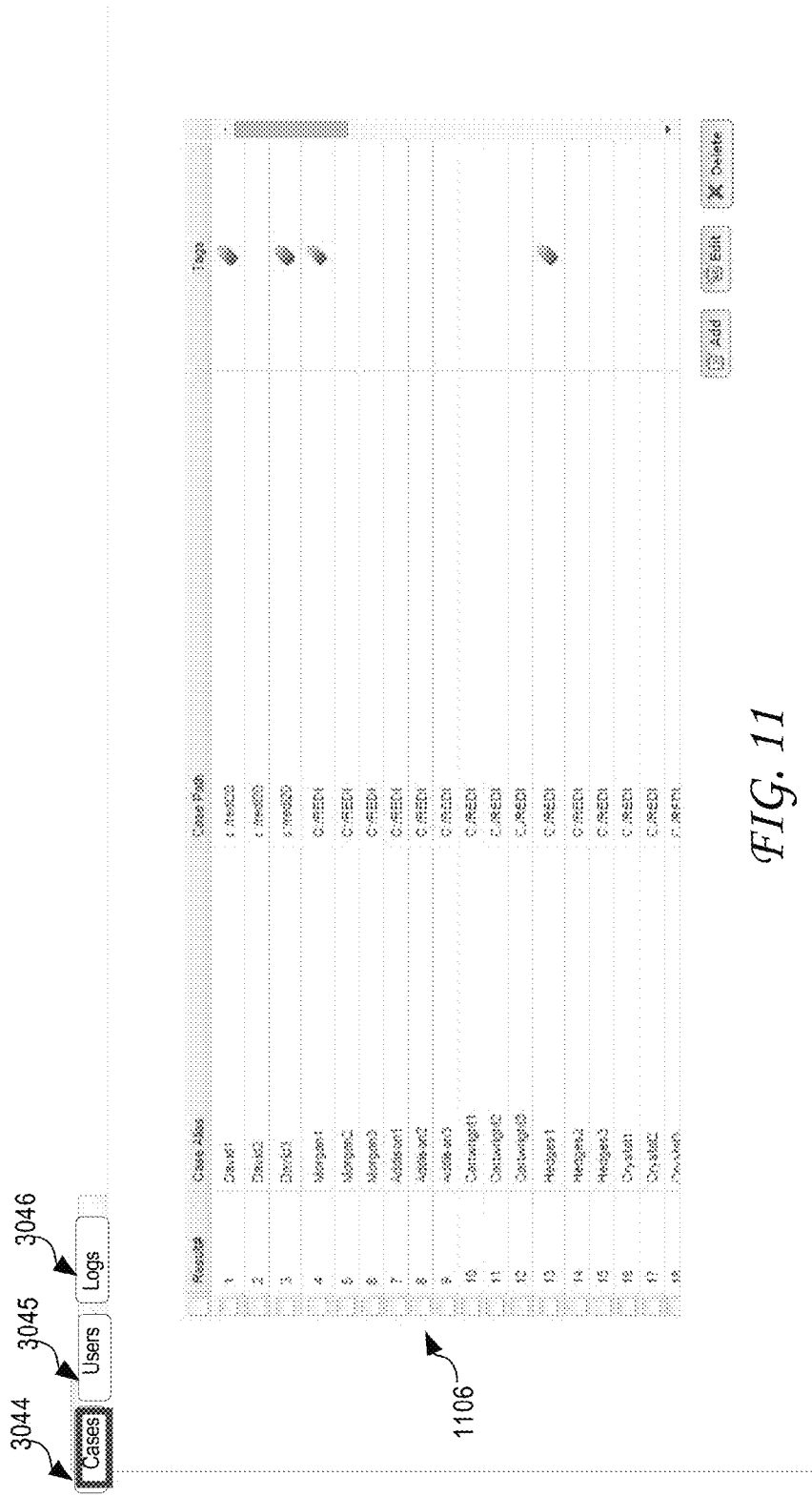
FIG. 11 is an example graphical user interface for a case view displayed for a system administrator.

FIG. 11 is an example graphical user interface for a case view displayed for a system administrator. The example depicted in FIG. 11 shows a display 1106 of the cases organized by case aliases. For each case alias, a case path is provided. If a particular case alias includes items that have associated tags, then the presence of the tags for the items may be indicated in display 1106.

Figure 12:
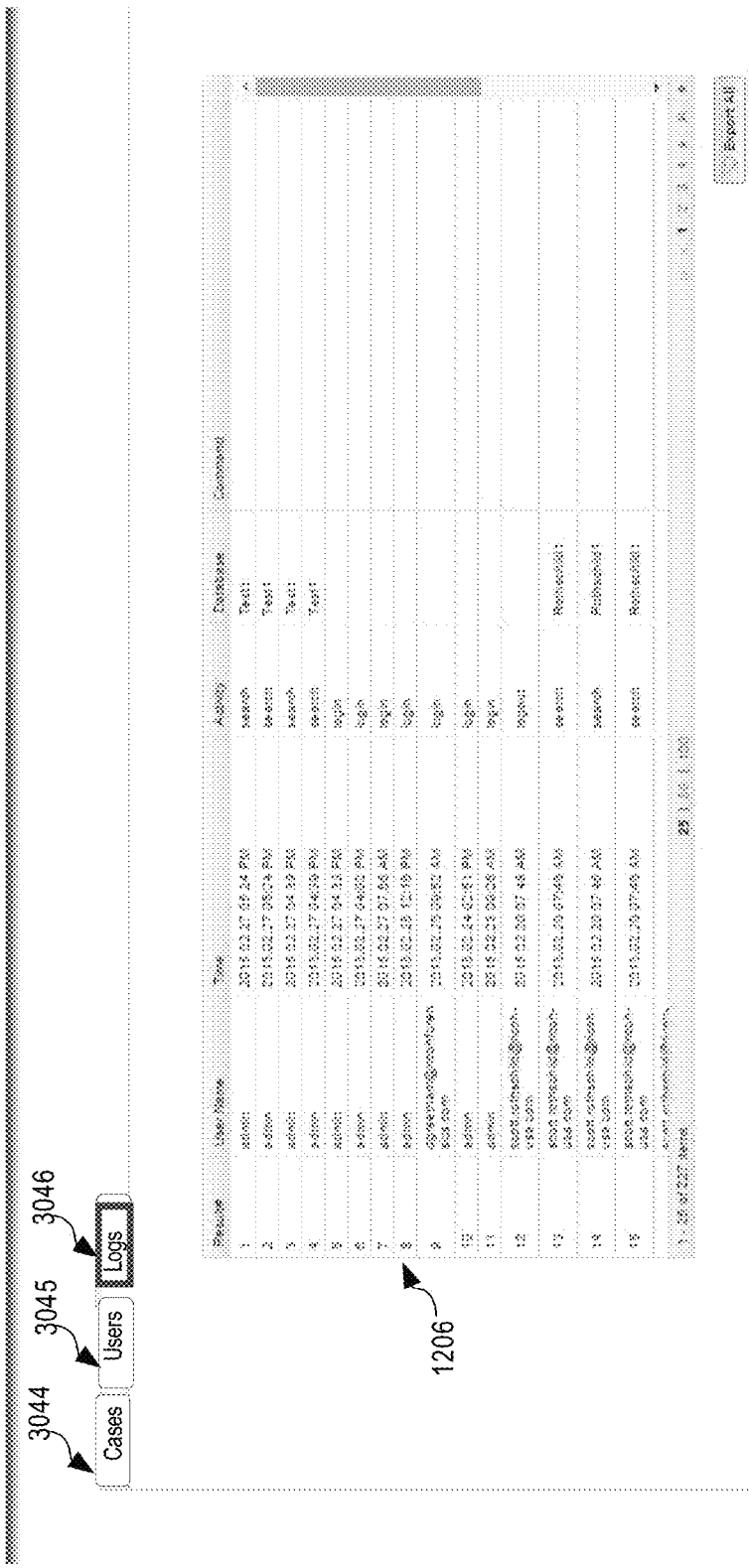
FIG. 12 is an example graphical user interface for a log view displayed for a system administrator.

FIG. 12 is an example graphical user interface for a log view displayed for a system administrator. This example allows an administrator to view user logs if the administrator selects a logs selector 3046. The example depicted in FIG. 12 shows a display 1206 of the cases organized by user logs. The display of the user logs may be organized by a user name. The display may include a display of the time when the log is created, a description of the activity that the user performed, an indicator of a database that the user used, and the like. Other arrangements of the user logs may also be generated and displayed.

D. Accessing a User Portal

In an embodiment, upon receiving, from a user via input credential object 910, particular user credentials, the credentials are validated. If the credentials are valid, then it is determined whether the credentials correspond to credentials of a non-administrator. A non-administrator is any user who may be granted access to an e-discovery tool and who is not an administrator. For simplicity, a non-administrator may be referred to as a client or a user.

In response to determining that the particular user credentials are valid and correspond to a non-administrator credentials, functionalities are customized to include those search functionalities, report functionalities and tag management functionalities that may be available to a non-administrator. Usually a non-administrator is granted less advanced privileges than an administrator. Thus, the functionalities that are available to the non-administrator may not include some functionalities that are available to the administrator. For example, while an administrator may have access to webpages that display information about all cases being processed by the e-discovery tool, all users who have accounts with the e-discovery tools, or all session logs captures by the e-discovery tool, non-administrators may not have access to those webpages.

IV. Bulk Tagging

In an embodiment, users may assign tags to items. The process of assigning tags to items provides a convenient way of tagging the items without a need to re-populating already generated reports. For example, once a user received a report from the discovery tool, the user may select various filters to be applied to the items included in the report and assign one or more tags to the items in the report.

In a simple case, one tag may be assigned to one item. However, a user may also assign one tag to multiple items, multiple tags to one item and multiple tags to multiple items. Assigning at least one tag to a plurality of items is referred to as a bulk tagging.

Figure 13:
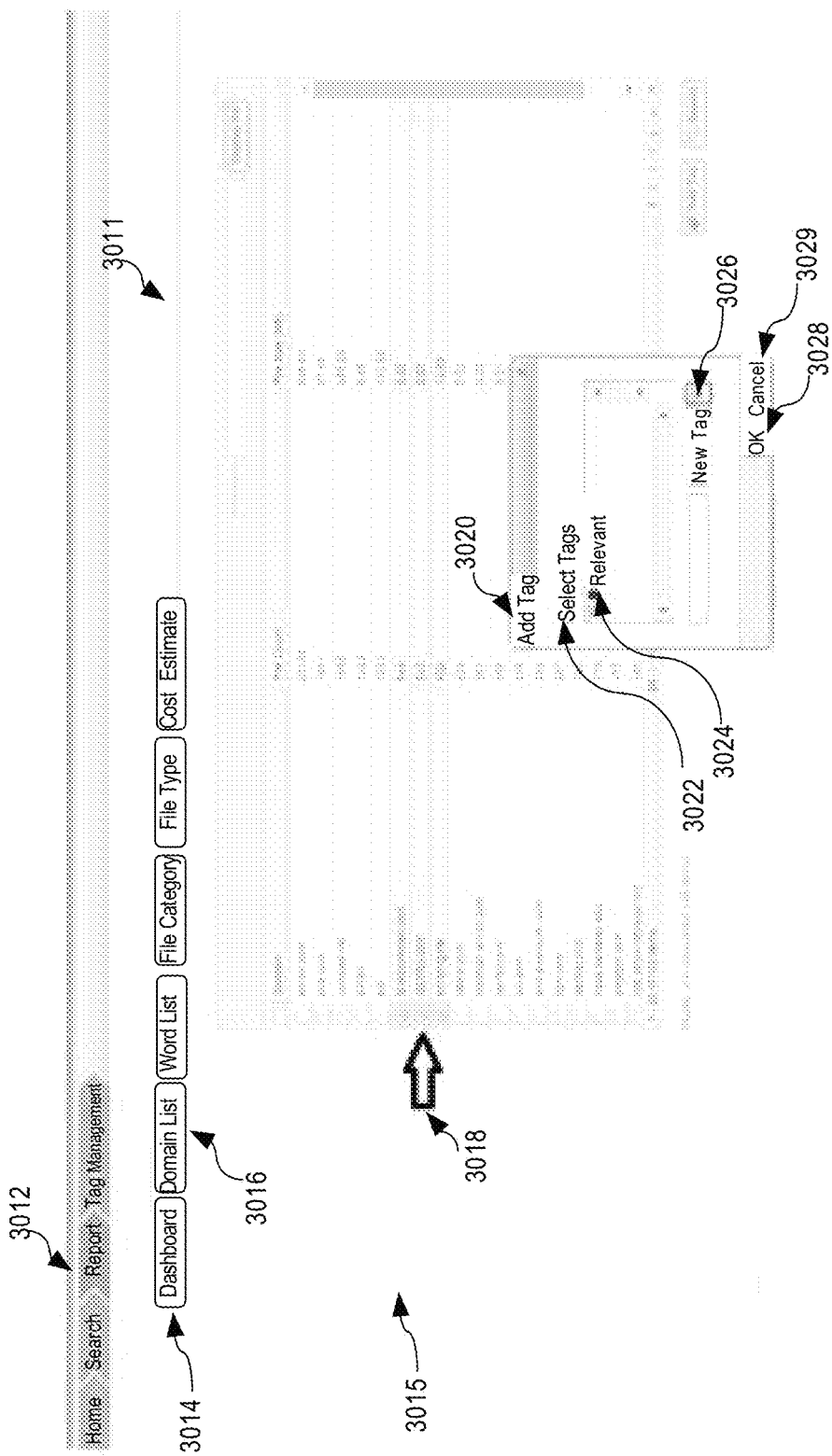
FIG. 13 depicts an example graphical user interface generated to enable a bulk tagging of items associated with email domains.

FIG. 13 depicts an example graphical user interface 3011 generated to enable a bulk tagging of items associated with email domains. Example user interface 3011 is merely one of many example implementations of the user interface that is configured to allow a user to perform a bulk tagging of items provided in a pre-populated approach.

In an embodiment, a bulk tagging approach is implemented to allow a user to tag items that correspond to certain email domains. In the example depicted in FIG. 13, it is assumed that a user has already generated a request for a report, and report data has been provided to the user.

Report data may include various types of items. For example, report data may include one or more of: tagged document files, tagged image files, tagged spreadsheet files, tagged attachments, tagged system files, tagged hidden files, tagged archive files, or tagged electronic messages.

The manner in which report data is provided to a user may vary and depend on the implementation. In the example depicted in FIG. 13, report data is presented to a user after a user requested report data and once a user selected a report tab 3012 displayed in the upper portion of the user interface 3011. Once the user selects report tab 3012, the report data is presented to a user in a report content display portion 3015 of the user interface 3011. The user may also be provided with a display of various tabs 3014 and an overlay window 3020 for tagging items displayed in report content display portion 3015.

Assigning tags to items returned in a report may be implemented in a variety of ways. One implementation is depicted in FIG. 13. In the depicted example, upon selecting a report tab 3012 from example graphical user interface 3011, a user may be presented with a display of various tabs 3014, report content display portion 3015 showing the report data, and an overlay window 3020. A user may select any tab from the tabs 3014.

Tabs 3014 may indicate various filters that may be applied to report data generated in a report for a user. For example, a user may filter the report data by domain names that are indicated in the report data. To filter the report data by the domain names, a user may select domain list tab 3016. A user may also filter the report data by a word list of the words that are included in the report data. A user may also filter the report data by a file category, a file type, and the like. A user may also request a cost estimate for reviewing the report data, the tagged report data, and the like.

A. Bulk Tagging of Items Associated with Email Domains

Upon selecting domain list tab 3016 from tabs 3014, report data generated for a user are sorted based on domain names associated with the report data. The report data may be sorted based on the domain names displayed for the user in report content display 3015. For example, if some of the report data have been provided by email_server_1.com and email_server_2.com domains, then the email_server_1.com and the email_server_2.com domains will be displayed in a list of domain names.

In an embodiment, a user may user a selector 3018 to select one or more domain names from a list of domain lists displayed for the user. Selection of the domain names from the list allows a user to assign one or more tags to all the documents, emails, files and data that correspond to the selected domains. For example, if email_server_1.com and email_server_2.com are displayed in a list of domain names, then using the selector 3018 the user may select either of the domains or both domains, and thus indicate that one or more tags are to be selected to emails that correspond to the selected email domains.

A user may add one or more tags to a bulk of items that correspond to one or more domain names selected from a domain list. Adding the tags may be facilitated using an add tag overlay window 3020. Using overlay window 3020, a user may select one or more tags from already defined tags or create new tags.

Graphical user interface 3011 for tagging items in bulk may be configured to generate and transmit to a client device one or more graphical user interface objects that allow a user to add one or more new tags to the plurality of tags. For example, if one or more tags are already defined and available to the user, a user may select one or more tags from the already defined tags, and tag, with the selected one or more tags, each item from a plurality of items that correspond to the selected one or more email domains from the plurality of email domains. The user may also create a new tag and add the newly created tag to a list of tags available to the user.

In the example depicted in FIG. 13, a tag called "relevant" 3024 is displayed in add tag overlay window 3020. A user may select that tag by pressing a select tags selector 3022. By doing so, the user will tagging, with the selected "relevant" tag 3024, each item from a plurality of items that correspond to one or more email domain names selected from the plurality of email domains using selector 3018.

Graphical user interface 3011 for tagging items in bulk may also be configured to generate and transmit to a client device one or more graphical user interface objects that allow a user to remove a tag from a list of tags already defined and available to the user. For example, if a tag "relevant" 3024 is already defined and available to a user, a user may select that tag using a selector "select tags" 3022 and then by selecting a cancel selector 3029 cause removing tag "relevant" 3024 from a list of selected tags.

In an embodiment, the process of tagging includes generating tagging data. More specifically, the tagging of items from a plurality of items may include generating tagging data specifying the tags and the tagged data. Tagging data may specify an assignment of the tags to each item from the plurality of items. For example, the tagging data for a particular tag may include one or more associations between the particular tag and each item from the plurality of items that correspond to the email domains that a user selected from the plurality of email domains.

Tagged items that correspond to one or more email domains that a user selected may include any type of electronic data that corresponds to the selected email domains. For example, the tagged items that correspond to the selected email domain may include data files, emails, image files, electronic documents, and the like.

The process of bulk tagging may allow a hierarchical assignment of the tags. For example, one or more items that already have tags assigned to them, may be grouped and have a new tag assigned. For example, one or more items from a plurality of items that correspond to the selected one or more email domains and have at least one tag already assigned, may be tagged with newly selected tags.

B. Exporting Tagged Items

In an embodiment, a user may export tagged items. For example, upon assigning one or more tags to the items that correspond to one or more selected email domains, a user may select an export selector 3049 depicted in FIG. 10, and cause exporting each item that has been tagged with the selected one or more tags. The exporting may include generating a hard copy of the exported items, or generating a webpage containing the exported items.

FIG. 10, described above, depicts an example graphical user interface that is also generated to enable exporting all documents related to a specific tag. In the depicted example, a system administrator may select the manner in which result data included in a report are to be presented. In the depicted example, the administrator may choose between selecting the result data organized by cases, by users and by logs. For example, to have the result data organized by the cases, the administrator may select a cases tab 3044. To have the result data organized by the users, the administrator may select a user tab 3045. To have the result data organized by the logs, the administrator may select a log tab 3046.

Once an administrator selects the manner in which result data is to be presented, the system displays the result data according to the administrator's specifications. For example, if the administrator selected cases tab 3044, the result data may be organized by a case identifier and displayed in a display area 3047.

Furthermore, an administrator may be provided with an overlay tag window 3048, in which one or more tags may be displayed, and which may include an export tagged items selector 3049. If the administrator selects one or more tags from overlay tag window 3048 and selects export tagged items selector 3049, the system may export all items related to the selected tags.

One of the benefits of exporting the items related to a selected tag is that exporting the items does not require accessing a database in which information about cases, users and logs is stored. The exporting of the items utilizes the information included in pre-populated reports generated for an administrator or a user. Once a report is populated, the administrator and the user may search the result data included in the report, tag the result data, export the items that include specified tags, and otherwise the result data.

C. Bulk Tagging of Items Having Certain Attributes

In an embodiment, a bulk tagging approach is implemented to allow a user to tag items that have certain attributes. For example, the bulk tagging approach may be implemented to allow a user to tag items that contain certain words or phrases.

Figure 14:
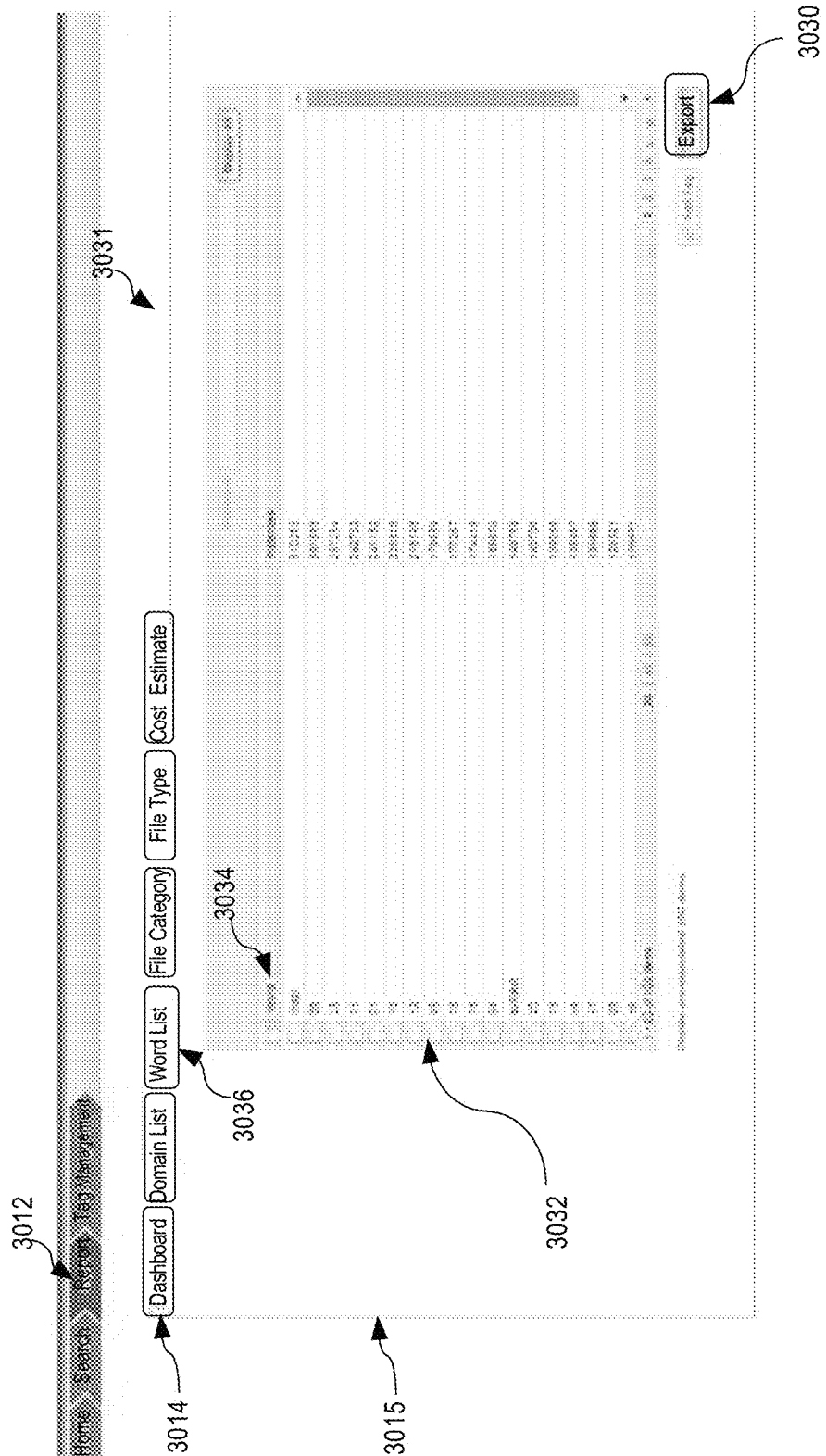
FIG. 14 depicts an example graphical user interface generated to enable a bulk tagging of items having certain attributes.

FIG. 14 depicts an example graphical user interface 3031 generated to enable a bulk tagging of items having certain attributes. In the example depicted in FIG. 14, it is assumed that a user has already generated a request for a report, and report data has been provided to the user. In the example depicted in FIG. 14, report data is presented to a user after a user requested report data and once a user selected a report tab 3012 displayed in the upper portion of the user interface 3011. If the user also selects a tab "word list" 3036, then the report data is presented to a user in a report content display portion 3015 in a format that allows identifying individual words that occur in the items included in the report data.

In an embodiment, the words that occur in the items included in the report data may be displayed in column 3034. The user may select one or more words from the words displayed in column 3034, and then select a selector "export" 3030 to tag the items that are included in the report and that contain the selected words.

For example, upon receiving a selection of one or more words from a plurality of words present in a plurality of items in the report data and displayed in column 3034, each item, from a subset of the plurality of items, in which one or more words are present may be tagged once the user selects export selector 3030.

In another approach (not depicted in FIG. 14), upon receiving a selection of one or more words from a plurality of words present in a plurality of items in the report data displayed in column 3034, a user may select one or more tags. For example, an overlay window, similar to overlay window 3020 in FIG. 13, may be displayed for the user, and the user may select one or more already defined tags, create one or more new tags, or both. Once a user selects and/or creates one or more tags, the user may use the tags to tag the items that contain the selected words. For example, upon receiving a selection of one or more tags from a plurality of tags, the user may tag, with the selected one or more tags, each item, from a subset of the plurality of items, in which the selected one or more words are present.

In an embodiment, a user may request that the tagged items be exported. For example, upon assigning one or more tags to the items that contain the selected words (or phrases), a user may select an export selector 3030, and cause exporting each item that has been tagged with the selected one or more tags. The exporting may include generating a hard copy of the exported items, or generating a webpage containing the exported items.

D. Bulk Tagging of Items Based on File Categories

In an embodiment, a bulk tagging approach is implemented to allow a user to tag items that belong to the same file category. For example, the bulk tagging approach may be implemented to allow a user to tag items that have been categories as "discovery documents," "relevant documents," and the like.

E. Bulk Tagging of Items Based on File Types

In an embodiment, a bulk tagging approach is implemented to allow a user to tag items that have certain attributes. For example, the bulk tagging approach may be implemented to allow a user to tag items that have certain file types. A file type may be determined based on a file extension, or based on the file signature. For example, the items whose file names have extension "doc" may be assumed to be documents, while the items whose file names have extension "jpg" may be assumed to be image files. A user may select one or more file extensions, select one or more tags, and then tag each items that has an extension that matches any of the file extensions with the selected one or more tags.

In an embodiment, identifying data and data files that have specific types is performed based on unique signatures that are embedded in the data files. Using unique signatures of the files to identify the data files to be collected is more reliable than using file extensions included in the file names because the file extensions may not necessarily correspond to the actual type of the file. Relying on the file signatures enables providing more accurate collection results than if the data collection is performed based on the file extensions.

A unique signature may represent unique characteristics of the file, and may be embedded in the file. Using unique signatures of the files to identify the data files to be tagged is more desirable than using file extensions included in the file names because the file extensions may not necessarily correspond to the actual type of the file. Since the file extensions, not the file signatures, can be modified by the user, tagging based on the file signatures provides more accurate results than if the tagging is performed based on the file extensions. Hence, a user may select one or more unique file signatures, select one or more tags, and then tag each items that contains the unique file signature with the selected one or more tags.

F. Tag Management

In an embodiment, tags and tagged files are managed by system administrators and users. Depending on the implementation, some tag management functionalities may be available to all users, other tag management functionalities may be available only to some users, while other tag management functionalities may be available only to system administrators. For example, a system administrator may be able to determine and modify privileges assigned to tags or determine and modify relevancy indicator to tags.

Figure 15:
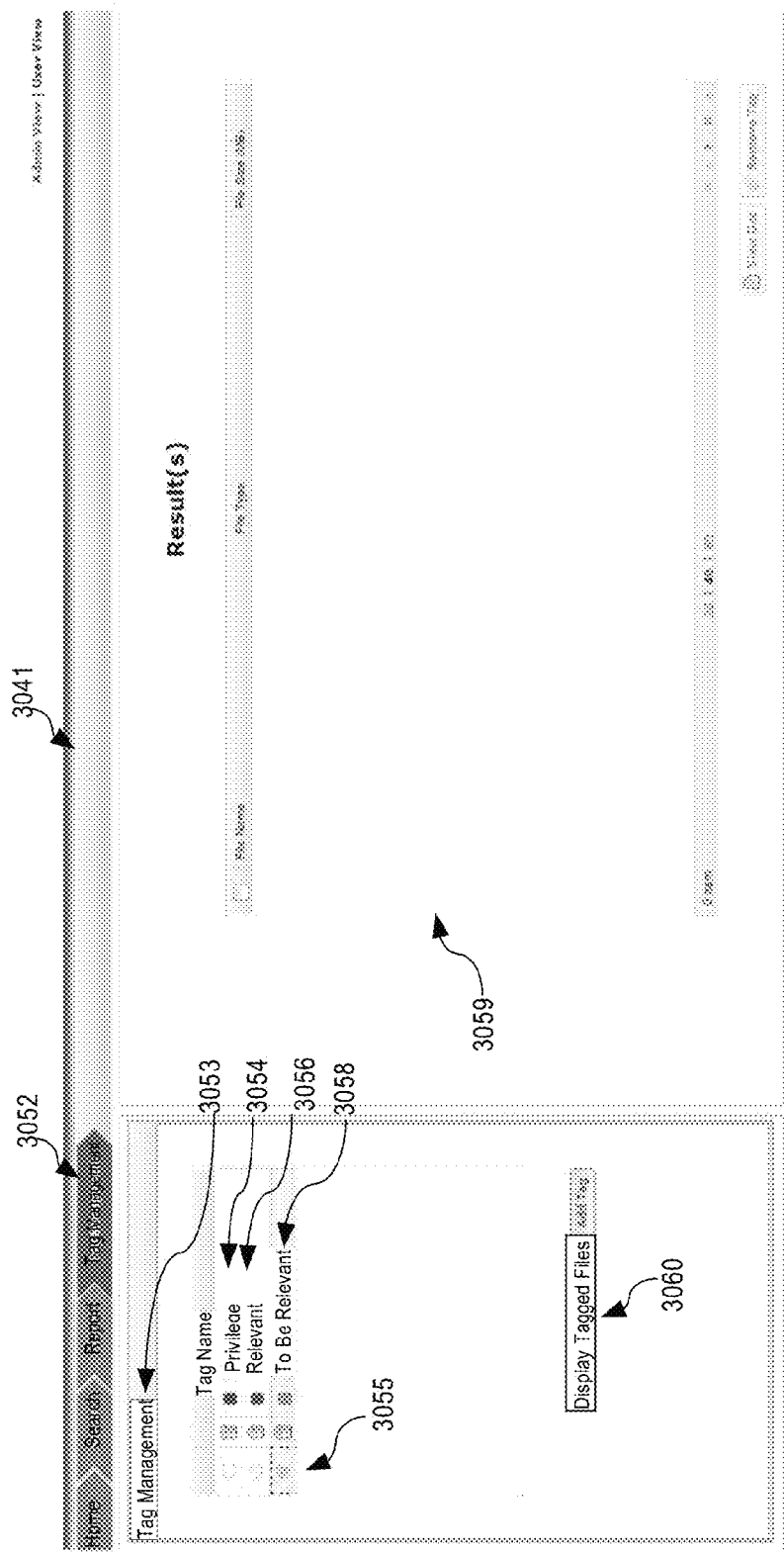
FIG. 15 depicts an example graphical user interface generated to enable a tag management.

FIG. 15 depicts an example graphical user interface 3041 generated to enable a tag management. The depicted graphical user interface 3041 is implemented in a system administrator view, and thus comprises tag management functionalities that are available to a system administrator. In other implementations, the functionalities depicted in FIG. 15 may be available not only to the system administrators, but also the some users, or even to all users.

In the depicted example, a system administrator selected a tag management tab 3052. In response to selecting tag management tab 3052, the administrator is presented with a tag management window 3053. Tag management window 3053 may include an arrangement of various icons and selectable boxes. The content of tag management window 3053 depends on the implementation and on the tags that have been already created by users. For example, if the users have already created one or more tags, then tag management window 3053 may include the names of the tags and one or more active selectors associated with the tags.

In an embodiment, tag management window 3053 includes a tag name column in which the names of already existing tags are included. In the depicted example, a "privilege" tag 3054, a "relevant" tag 3056, and a "to be relevant" tag 3058 have been already created, and the respective names of the tags are shown in the tag column of tag management window 3053.

Next to the tag names, one or more objects (icons) may be displayed to allow a user to select a particular tag, to delete a particular tag, to color-code a particular tag, and so forth. For example, by selecting an icon 3055 displayed next to a "to be relevant" tag 3058, a user may select the tag 3058.

Once a user selects one or more tags, the user may select an object called a display tagged files 3060 to request displaying of the files that have been already tagged with the selected tags. For example, if one or more users have already tagged certain documents with "to be relevant" tag 3058, then a system administrator may select display tagged files object 3060 to request displaying all documents that have "to be relevant" tag 3058 already assigned. The results may be displayed in a result area 3059 of graphical user interface 3041.

G. Adding a Tag

In an embodiment, a user may add a tag and/or remove a tag. For example, a user may add a tag by selecting an add tag objects, and then by creating a new tag, or selecting an already created tag that has not been previously managed.

Figure 16:
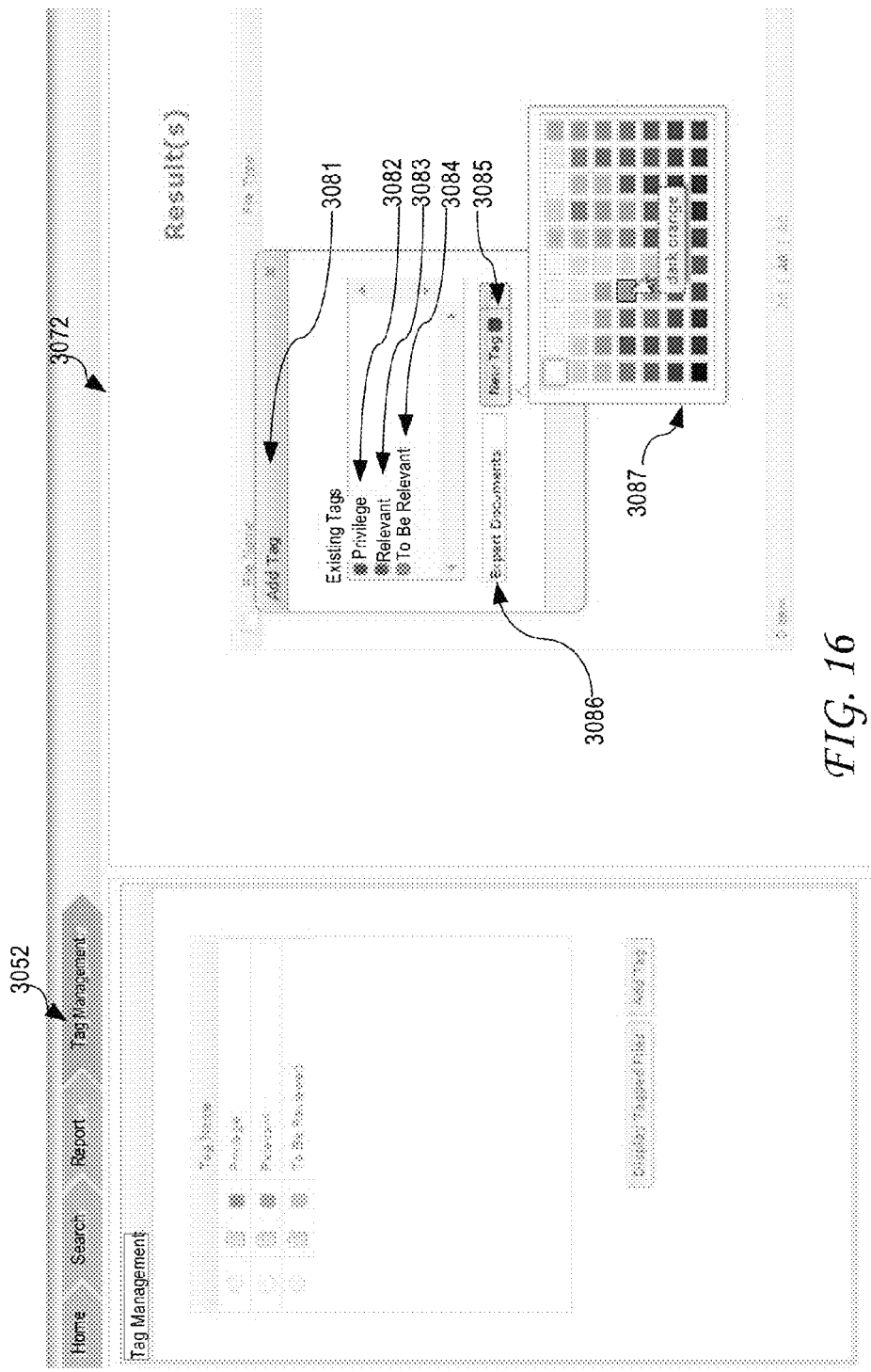
FIG. 16 depicts an example graphical user interface generated to enable adding a tag.

FIG. 16 depicts an example graphical user interface 3072 generated to enable adding a tag. The depicted graphical user interface 3072 is implemented in a system administrator view, and thus comprises tag management functionalities that are available to a system administrator. In other implementations, the functionalities depicted in FIG. 16 may be available not only to the system administrators, but also the some users, or even to all users.

In the depicted example, a system administrator selected tag management tab 3052 and selected an object that allows a user to add a tag. In response, the system may display an add tag interactive window 3081. Using the interactive window, the user may add one or more tags to a set of existing tags. In the depicted example, the existing tags include a privilege tag 3082, a relevant tag 3083 and to be relevant tag 3084. Suppose the user wishes to add a new tag called "expert documents" in a text box 3086. Once a user types in the text "expert document" in text box 3086, the system may display a color chart 3087, from which the user may select a particular color for color coding the expert documents tag. Once the user selects a particular color for the expert documents tag and selects a new tag selector 3085, the system adds the expert document tag to the set of existing tags, updates the set of existing tags, and displays the updated set of existing tags in overlay window 3081.

H. Displaying Tagged Results

In an embodiment, a user may request that the tagged results by displayed on a display device. For example, once one or more items returned in a pre-populated reports have been tagged with one or more tags, a user may request that the tagged items be displayed for the user.

Referring again to FIG. 8, which was briefly described above, FIG. 8 provides an example of a display of tagged results. The example depicted in FIG. 8, includes graphical user interface 3092 generated to enable displaying tagged results. The depicted graphical user interface 3092 is implemented in a system administrator view, and thus comprises the functionalities that are available to a system administrator. In other implementations, the functionalities depicted in FIG. 8 may be available not only to the system administrators, but also the some users, or even to all users.

In the depicted example, a system administrator selected tag management tab 3052. In response to selecting tag management tab 3052, the administrator is presented with a tag management window 3053. Tag management window 3053 may include an arrangement of various icons and selectable boxes. The content of tag management window 3053 depends on the implementation and on the tags that have been already created by users. For example, if the users have already created one or more tags, then tag management window 3053 may include the names of the tags and one or more active selectors associated with the tags.

In an embodiment, tag management window 3053 includes a tag name column in which the names of already existing tags are included. In the depicted example, the following tags have been already created: an "expert documents" tag, a "privilege" tag, a "relevant" tag, and a "to be relevant" tag.

Next to the tag names, one or more objects (icons) may be displayed to allow an administrator to select a particular tag, to delete a particular tag, to color-code a particular tag, and so forth. For example, by selecting an icon 3055 displayed next to "to be relevant" tag 3058, the administrator may select the tag 3058.

Once the administrator selects one or more tags, the administrator may select an object called a display tagged files 3060 to request displaying of the files that have been already tagged with the selected tags. For example, if one or more users have already tagged certain documents with "to be relevant" tag 3058, then the administrator may select display tagged files object 3060 to request displaying all documents that have "to be relevant" tag 3058 already assigned. The results may be displayed in a result area 3099 of graphical user interface 3092.

Graphical representation of result area 3099 and object arrangements within result area 3099 may depend on the implementation. In the depicted example, result area 3099 contains rows of data that correspond to items that are tagged with "to be relevant" tag 3058. The items may include information about email domains, information about files, information about documents, and the like, that have been tagged with "to be relevant" tag 3058.

In an embodiment, result area 3099 includes rows of data corresponding to files that have been tagged with "to be relevant" tag 3083, and columns labeled as a row selector 3094, a fine name column 3095, a file type column 3096, and a file size column 3097. Selecting a particular row in result area 3099 may be accomplished by selecting a row selector object present in the particular row. In the depicted example, an administrator selected s row 3098, which corresponds to a data record indicating a file that has a file name "EIM Meeting 38C1," that is a Microsoft Outlook Note file, and that has a size of 0.01 MB.

Result area 3099 may also include other icons and buttons that allow an administrator to manage result data. For example, result area 3099 may include an interactive button that allows the administrator to view the selected document. For example, if an administrator selected row 3098, which includes a data record indicating the "EIM Meeting 38C1" file, and then selected a "view document" button, then the system may display the content of the "EIAM Meeting 38C1" file.

In an embodiment, an administrator may view more than one selected document at the time. For example, if the administrator selects two or more rows in result area 3099, and then selects a "view document" button, then the system may display the contents of each of the selected files. The contents may be displayed in one window, allowing the user to scroll down to view separately the contents of each of the selected file. Alternatively, the system may generate and display a separate window for each of the files, and display in the windows the corresponding content.

Result area 3099 may also include an interactive button that allows an administrator to remove one or more tags that are associated with the selected result items. For example, if an administrator selected row 3098, which includes a data record indicating the "EIM Meeting 38C1" file, and then selected a "remove tag" button, then the system may remove all the tags that are assigned to the "EIAM Meeting 38C1" file.

In an embodiment, an administrator may remove tags from more than one selected document at the time. For example, if the administrator selects two or more rows in result area 3099, and then selects a "remove tag" button, then the system may remove the tags from each of the selected files.

Figure 17:
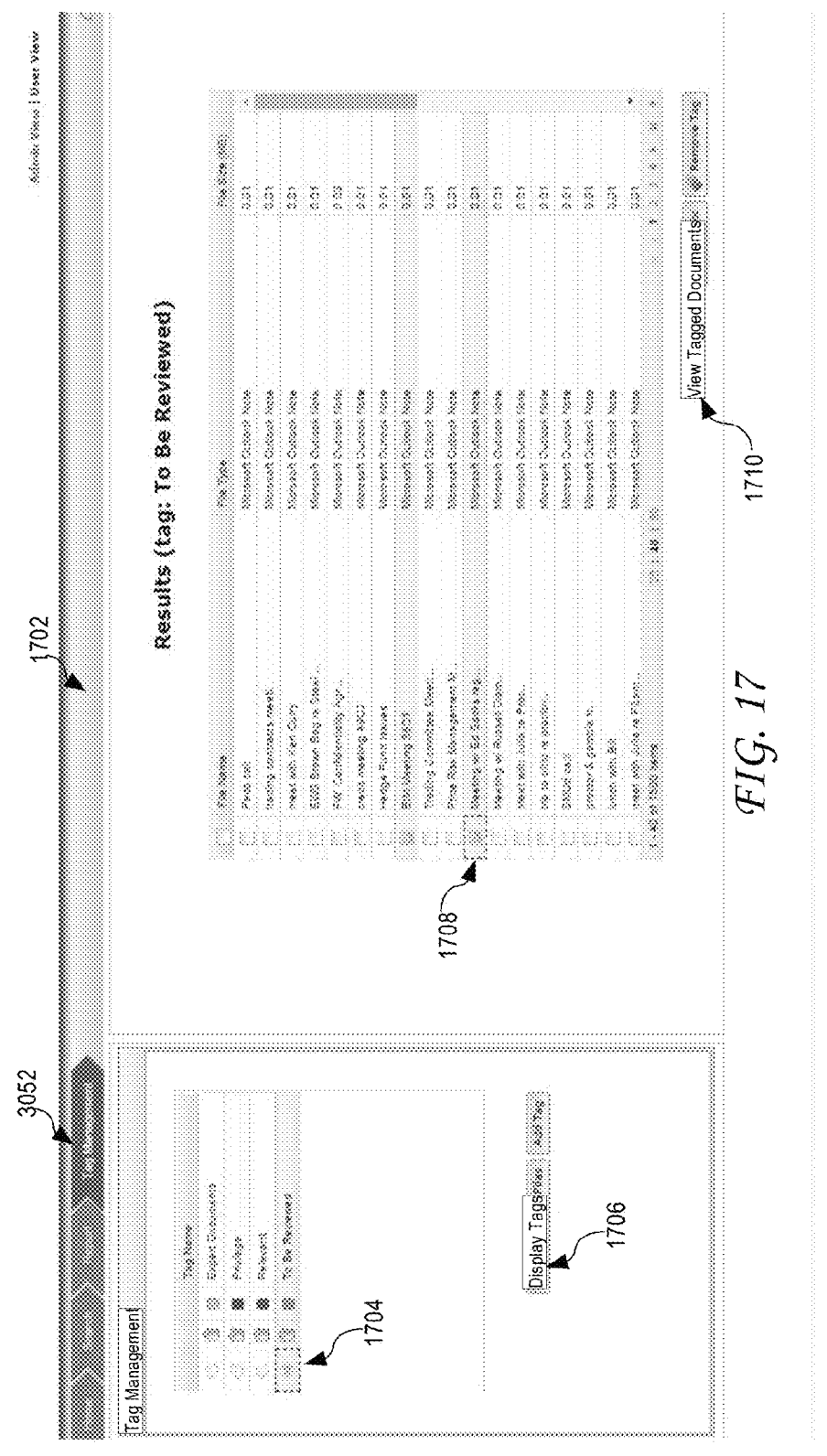

FIG. 17 depicts an example graphical user interface 1702 generated to view tagged items. In the depicted example, a user has selected tag management functionalities 3052, and choose a particular tag by selecting a selector 1704. Then the user selected a display tag selector 1706, and the e-discover system displayed a set of tagged results in a display portion 1708 of graphical user interface 1702. Subsequently, the user selected one or more file names 1708 that correspond to files that have been tagged with the particular tag. To view the files that have the selected names (and that have been tagged with the particular tag), the user may select a selector 1710, and receive a display containing contents of the selected and tagged files. Arrangements of the displays of the contents of the selected and tagged files may vary and may depend on the implementation. FIG. 17 depicts only one example of such an implementation.

I. Tag Usage

In an embodiment, a bulk tagging approach allows providing a summary of a top tag usage. A top tag usage may be graphically depicted using various graphs, charts, icons, and the like.

Figure 18:
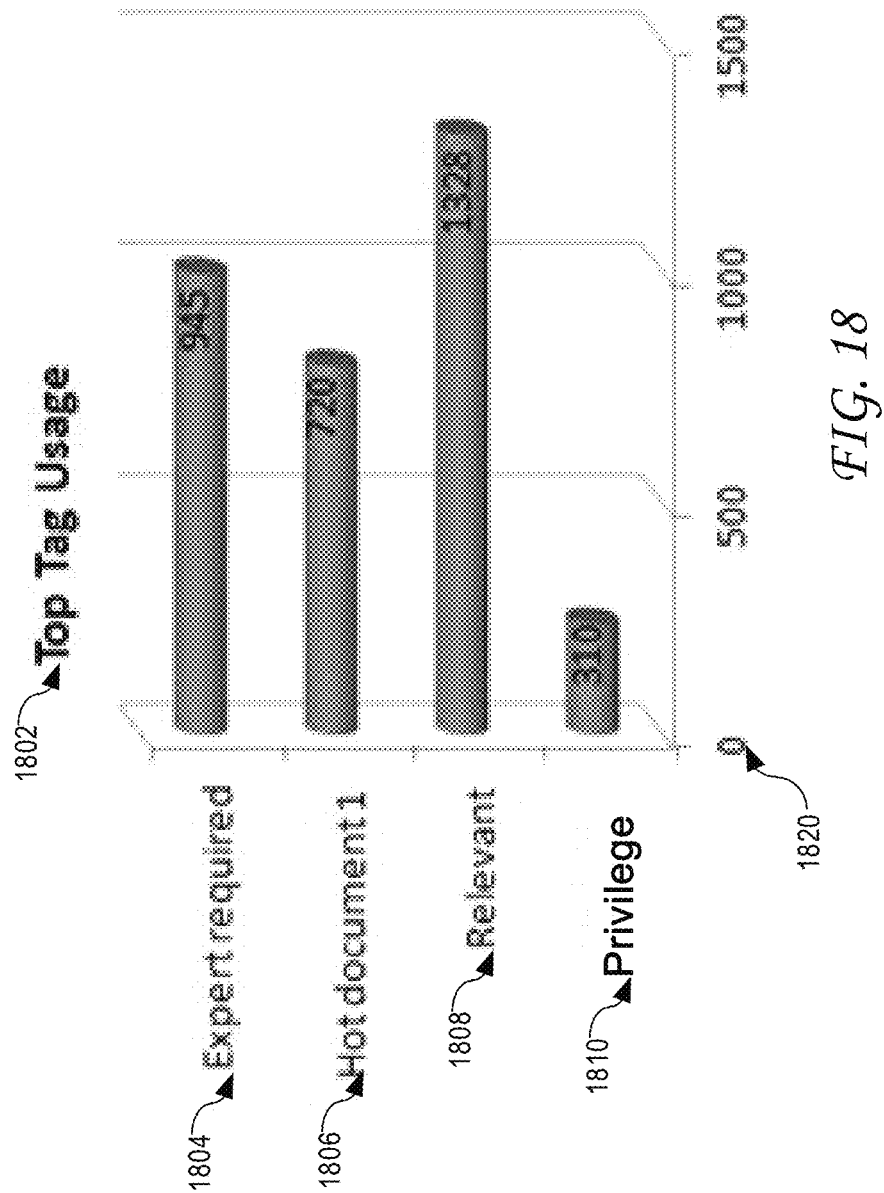
FIG. 18 depicts an example graphical user interface for displaying a tag usage.

FIG. 18 depicts an example graphical user interface for displaying a tag usage. The depicted example, includes a two-dimensional top tag usage graph 1802. Names of the top tags (the most often used tags) are displayed along the X-axis of usage graph 1802, and values 1820 representing the tag usage are displayed along the Y-axis of usage graph 1802.

In the depicted example, a set of top tags includes an expert required tag 1804, a hot document 1 tag 1806, a reluctant tag 1808 and a privilege tag 1810, and the corresponding names of the tags are depicted along the X-axis of usage graph 1802.

The frequency with which tags are used by users of an e-discovery tool may be represented using numerical or alphanumerical values plotted along the Y-axis of usage graph 1802. If numerical values are used, then the values may be scaled, normalized, or otherwise processed. In the example depicted in FIG. 18, relevant tag 1808 has been used more often than other top tags, and privilege tag 1810 has been less frequently than other top tags.

J. Cost Estimator

In an embodiment, a bulk tagging approach allows providing a cost estimate for reviewing tagged items. A cost estimate may pertain to an estimate time that may be required to review the tagged items by individuals who have expertise in reviewing the tagged items. For example, if tagged items represent electronic documents collected during a discovery process in litigation proceedings, then the system may determine the time needed to review the tagged documents, and the cost of reviewing the tagged documents.

Figure 19:
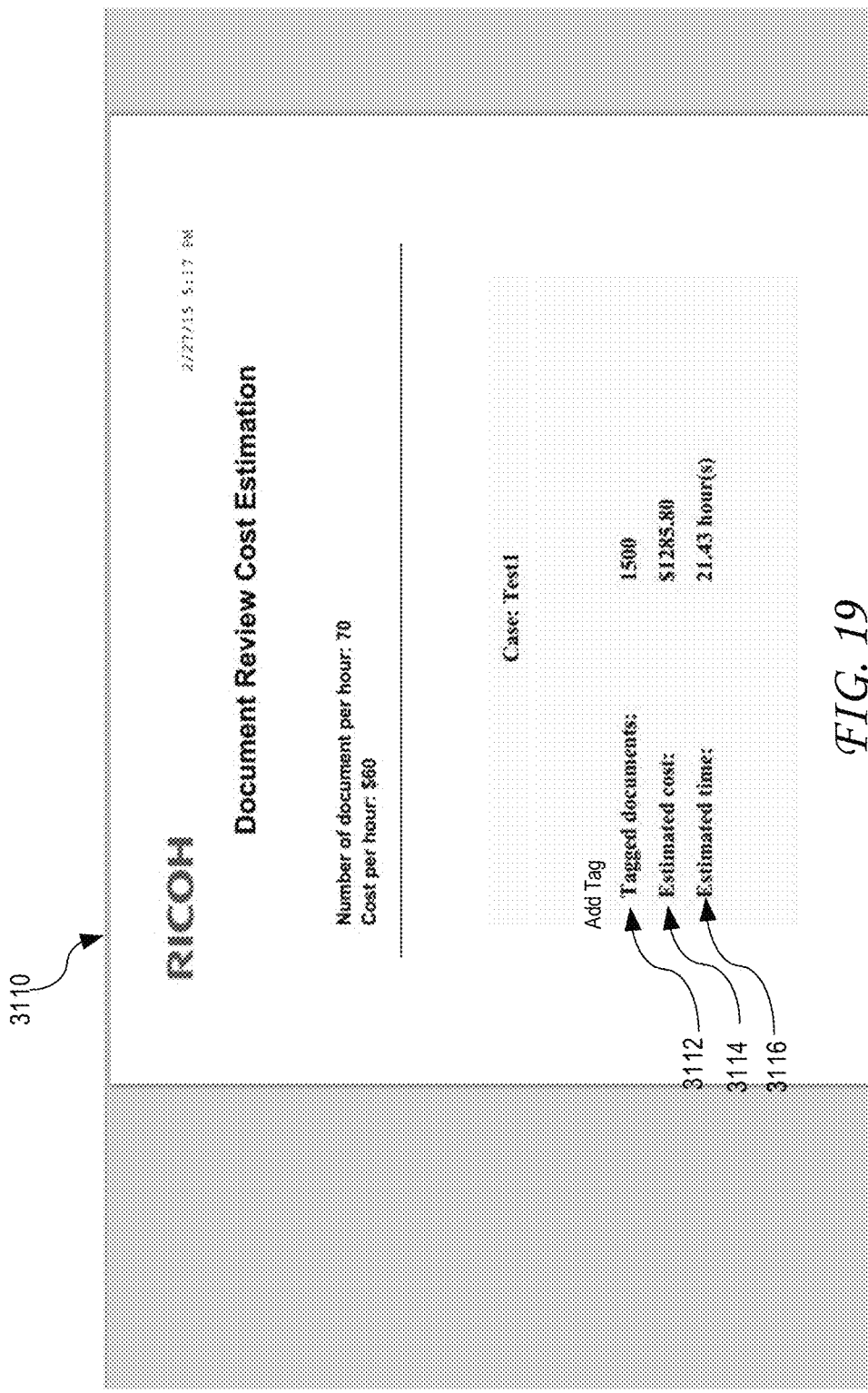
FIG. 19 depicts an example graphical user interface for displaying a cost estimate.

FIG. 19 depicts an example graphical user interface 3110 for displaying a cost estimate. Graphical user interface 3110 includes a display of the number of documents that reviewers may review within an hour, the cost of reviewing documents within an hour and information specific to the tagged documents. Suppose that the reviewers may review 70 tagged documents per hour and the cost of reviewing tagged documents per hour is $60. Hence, if there are 1500 of tagged documents 3112, then an estimated cost 3114 of reviewing those documents may be about $1286 and an estimated time 3116 may be 21.43 hours. The above example is provided merely to illustrate one of many implementations of the cost estimator.

In an embodiment, an e-discovery system is configured to execute a Web application for determining cost and time estimates for reviewing tagged documents. For example, when executed, the Web application may allow determining, based at least upon a number of tagged electronic documents, an estimated cost to review the tagged electronic documents results. The estimate may be based upon a review cost per electronic document or an estimated time to review each tagged electronic document. Other approaches for estimating the cost and/or the time for reviewing tagged electronic items may also be implemented.

V. Report Customization

In an embodiment, an e-discovery tool provides capabilities for customizing reports generated from data populated from logical data collections. Customization may pertain to selecting a color scheme from a plurality of available color schemes, and using the selected color scheme to graphically represent the report data. Customization may also include filtering the report data by a file name, a file category, certain attributes identified in the report data, and the like.

A. Dynamic Update of Color Schemes

In an embodiment, an e-discovery tool provides capabilities for customizing reports by selecting a color scheme from a plurality of available color scheme to be used to graphically represent the report data.

The ability to customize graphical representations of report data provides many benefits. For example, if a graphical representation of particular report data includes a pie chart having multiple pie sections, then a user may want to change the colors assigned to the individual pie sections to improve readability of the pie chart. Suppose two neighboring pie sections are shaded in colors close to each other in hue values. Since the two colors may be difficult to distinguish from each other in the pie sections, a user may want to assign to the corresponding pie sections different colors and thus improve the contrast between the pie sections. The colors may be changed by individually selecting and assigning new colors to the corresponding sections, or by selecting another color scheme from a menu of available color schemes. A user may continue selecting different color schemes until the colors shown in the individual pie sections ensure the satisfactory clarity of the pie chart as a whole.

In an embodiment, upon accessing a logical data collection and executing a search query on data included in the collection, search results are obtained and populated, and report data is generated from the populated data.

Report data may be presented to a user is a form of a visual representation of the data. A visual representation of report data may be generated by determining a color scheme for the representation and using the color scheme to graphically represent the report data. Once the color scheme is determined, the visual representation of the report data is displayed on a user display device.

As a user is reviewing report data, the user may wish to change a color scheme used to graphically represent the data. For example, a user may select a color schemes selector, and in response to making the selection, the user may be presented with a menu providing one or more choices of different color schemes.

Upon receiving, from a user, a user selection of a particular color scheme from one or more choices of different color schemes, the particular color scheme may be used to automatically update the visual representation of the report data, and displaying the updated visual representation of the report data on a display of the user device.

Figure 20:
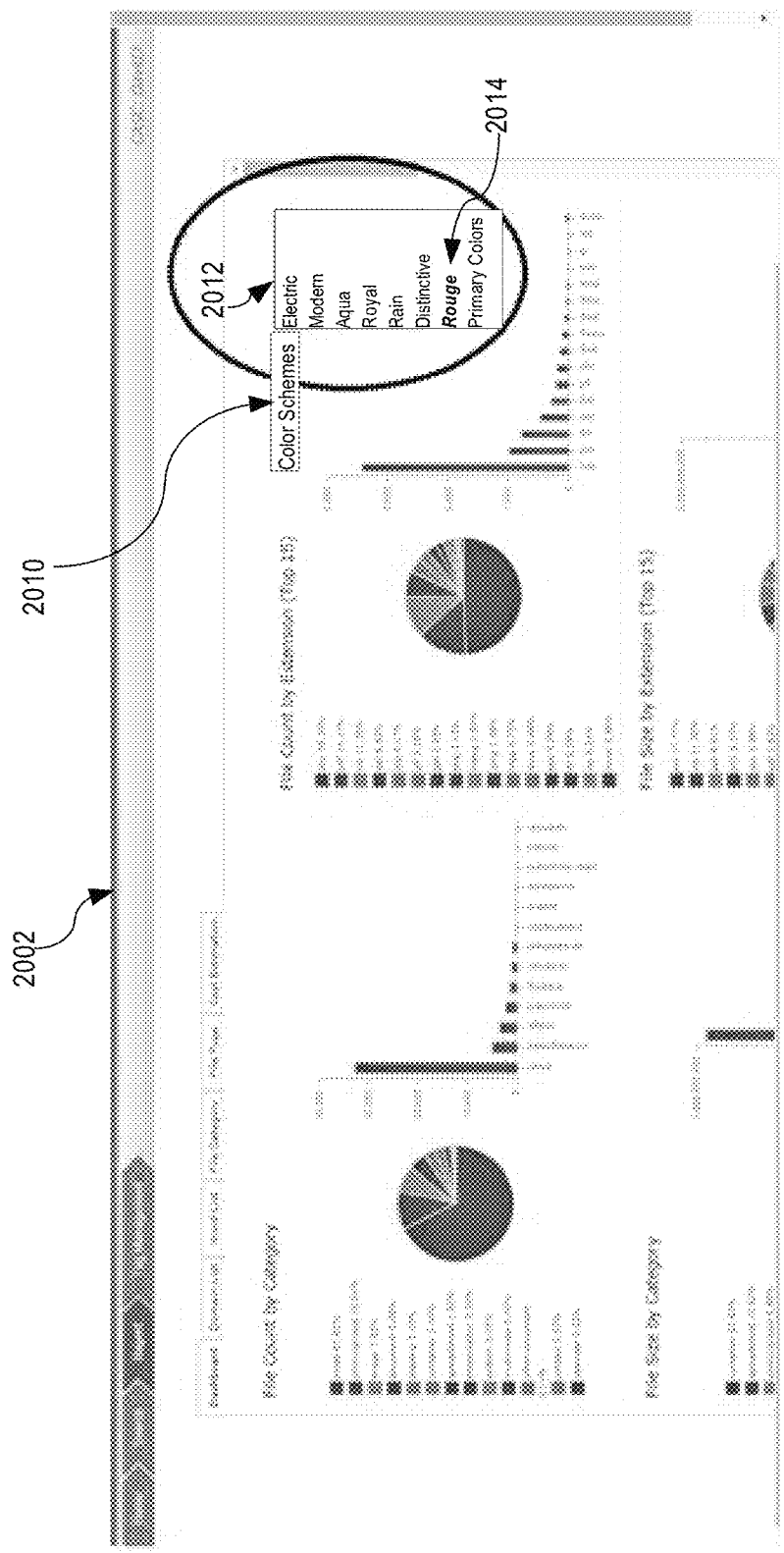
FIG. 20 depicts an example graphical user interface for selecting a color scheme for report data.

FIG. 20 depicts an example graphical user interface 2002 for selecting a color scheme for report data. Graphical user interface 2002 shows one of many possible graphical representations of report data pre-populated for a user. Suppose that a user has some difficulties in distinguishing individual pie segments in the pie charts shown in FIG. 20. To improve the clarity of the graphical representation of the report data, the user may select a color schemes selector 2010. In response to selecting color schemes selector 2010, a user may be presented with a menu 2012 showing a plurality of choices of different color schemes.

A menu for color schemes may contain one or more color scheme choices. The choices may depend on the implementation. In the example depicted in FIG. 20, the color schemes choices include the following color schemes: electric, modern, aqua, royal, rain, distinctive, rouge, and primary colors.

Each color scheme may have a set of settings. Associated settings may specify a color palette to be used to represent report data, an order in which the colors from the color palette are used to represent multi-color representations of report data, specifications of character fonts, specifications of font sizes, and the like.

Suppose that a color scheme used to generate a graphical representation of report data was an "electric" color scheme, and that a user has some difficulties in distinguishing individual pie segments in the pie charts shown in FIG. 20. To improve the clarity of the visual representation of the report data, the user may change the color scheme by selecting another color scheme from menu 2012.

Suppose that a user wishes to change a color scheme from "electric" to "rouge." The change may be implemented by selecting a "rouge" color scheme indicator 2014 shown in menu 2012. Once "rouge" color scheme indicator 2014 is selected, the selected "rouge" color scheme is used to automatically update the graphical representation of the report data.

Updating a graphical representation of the report data using another color scheme is performed automatically. It does not require repopulating report data or accessing logical data collections.

Furthermore, automatic updating of the graphical representation of report data involves a synchronized updating of all report data that have been generated for a user. For example, if a user requested two or more sets of report data, once the user changes a color scheme in one graphical representation of one report data, other graphical representations of other report data in the set may also be automatically updated.

Figure 21:
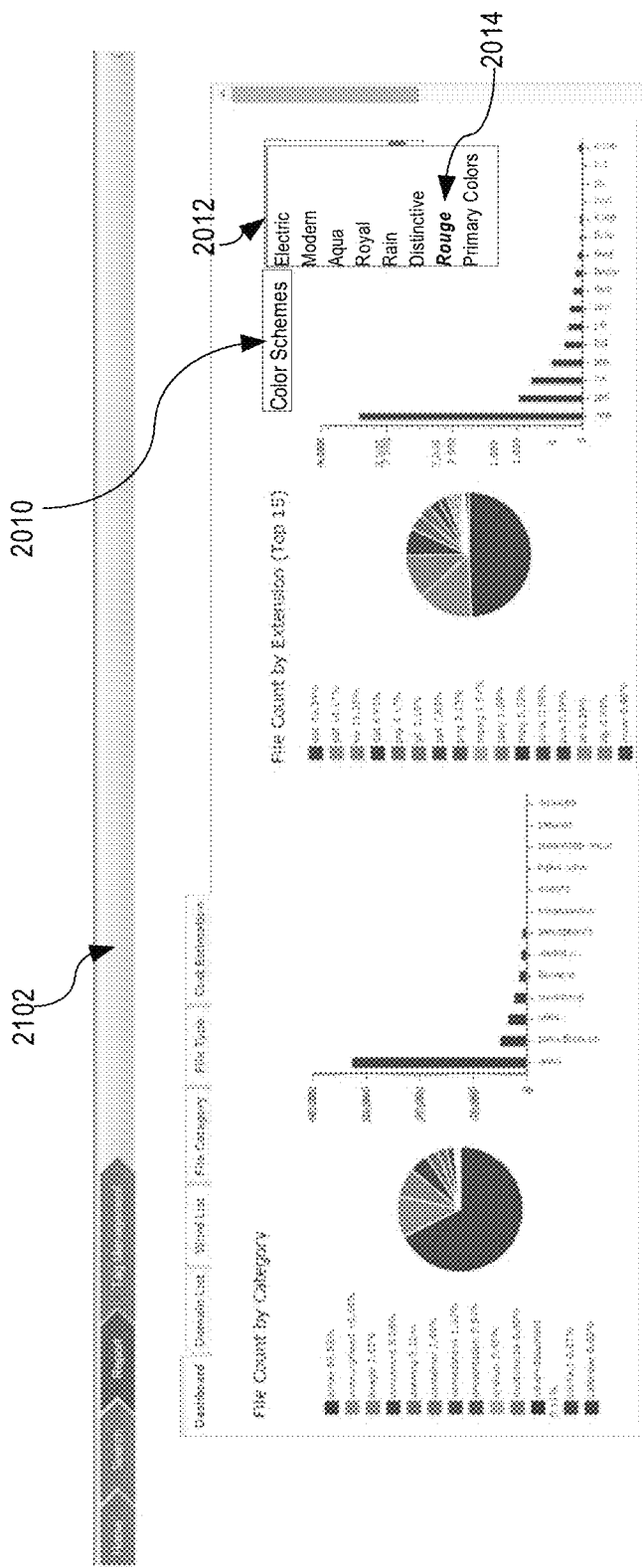
FIG. 21 depicts an example graphical user interface for showing an effect of automatically updating a color scheme for report data.

Effect of updating a color scheme used to generate a visual representation of report data is shown in FIGS. 20 and 21. Pie charts depicted in FIG. 20 are represented using an "electric" color scheme, while pie charts depicted in FIG. 21 are represented using a "rouge" color scheme.

Selection of a color scheme to represent the report data is subjective and depends on individual preferences and color sensitivity. For example, while some users may find an "electric" color scheme used to represent the pie charts more appropriate (FIG. 20), other users may prefer using the "rouge" color scheme (FIG. 21).

FIG. 21 depicts an example graphical user interface 2102 for showing an effect of automatically updating a color scheme for report data. Visual representation of the report data includes two pie charts. The depicted example shows that the pie charts are represented using a "rouge" color scheme. The "rouge" color scheme used to graphically represent the pie charts in FIG. 21 is different than an "electric" color scheme used to graphically represent the pie charts in FIG. 20. The automatic update of the color scheme was performed upon receiving a user selection of "rouge" selector 2013 from choices menu 2012. Since users perceive colors differently, some users may prefer the "rouge" color scheme (FIG. 21), while other users may prefer the "electric" color scheme (FIG. 20).

If a user determines that a "rouge" color scheme, used to graphically represent the pie charts in FIG. 21, is still unsatisfactory, then the user may select another color scheme from choices menu 2012. In response, the graphical representation of the report data may be automatically updated and displayed for the user on a user display device.

B. Dynamic Update of a Dashboard Display

In an embodiment, an e-discovery tool provides capabilities for customizing report data displayed in a dashboard generated by the tool. Customization may pertain to selecting a color scheme from a plurality of available color schemes, and using the selected color scheme to graphically represent the report data in the dashboard. Customization may also include filtering the report data by a file name, a file category, certain attributes identified in the report data, and the like, and causing displaying the filtered report data in the dashboard.

Figure 22A:
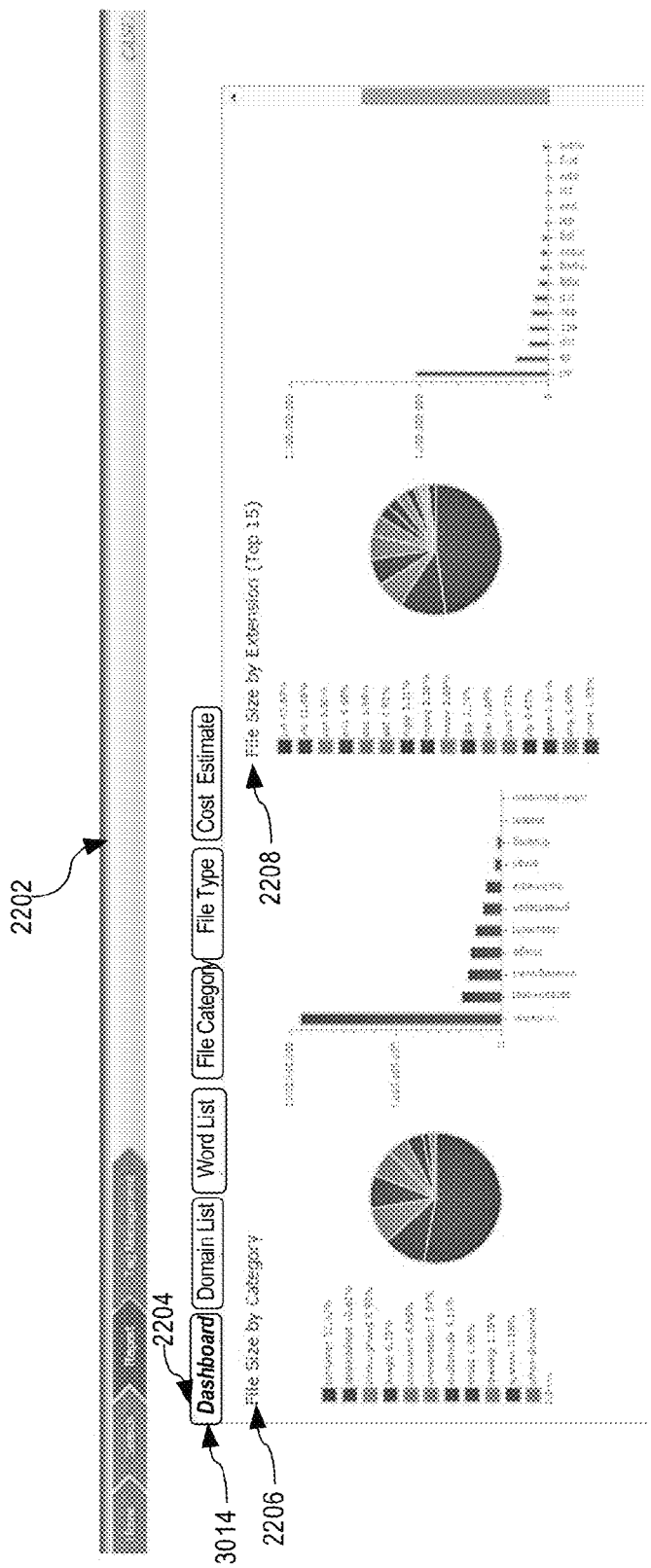
FIG. 22A depicts an example graphical user interface for customizing a dashboard.
Figure 22B:
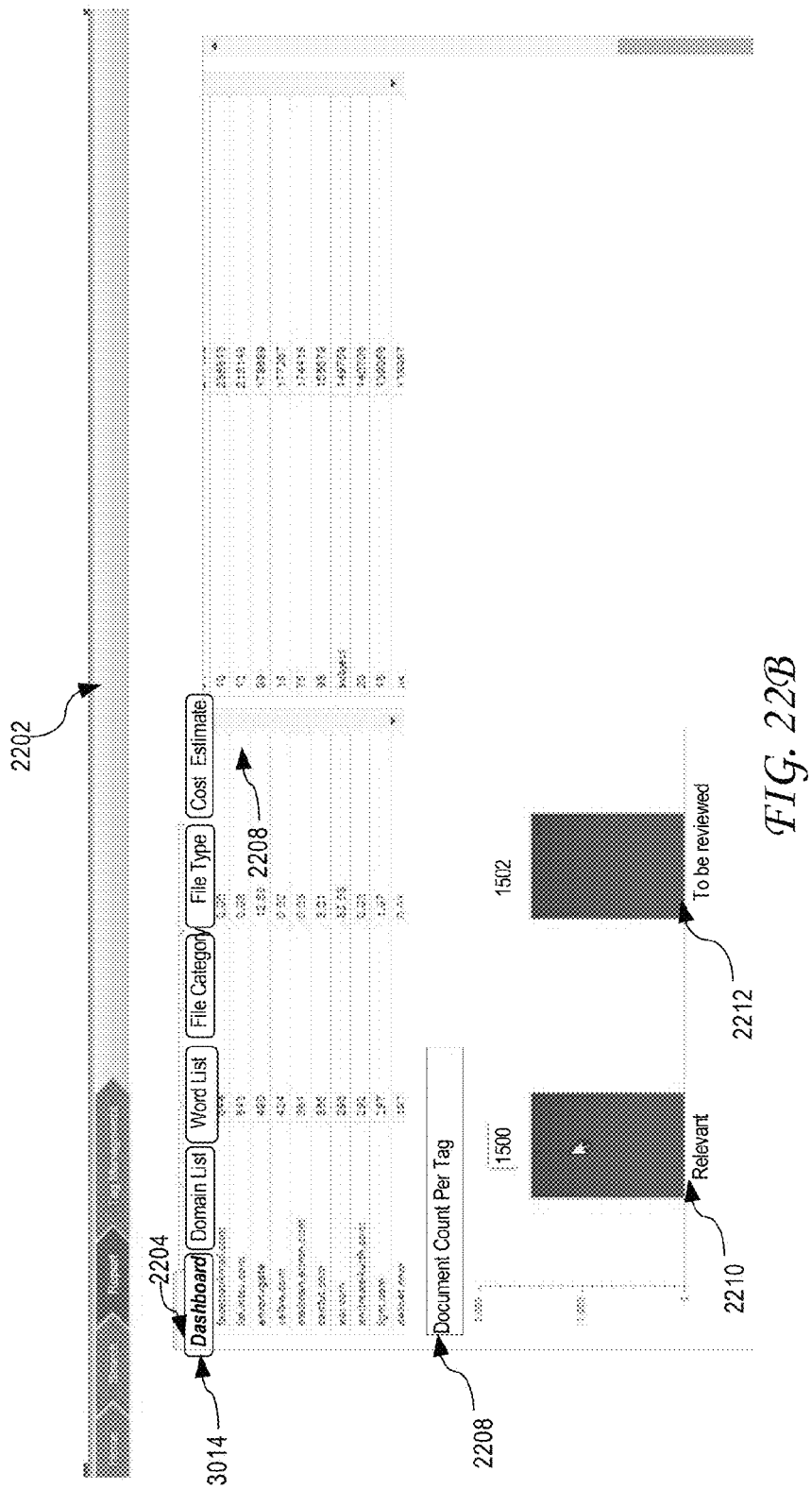
FIG. 22B depicts an example graphical user interface for customizing a dashboard.

FIG. 22A-22B depict an example graphical user interface 2202 for customizing a dashboard. Graphical user interface 2202 includes various tabs, icons and graphical representations of report data. For example, graphical user interface 2202 may include a tab selection set 3014, which includes a dashboard tab 2204, and other tabs, such as a domain list tab, a word list tab, a file category tab, a file type tab, a cost estimate tab, and the like.

In an embodiment, a user selects a tab from tab selection set 3014. In response to determining that a user selected dashboard tab 2204, report data may be repopulated. Repopulating may be performed based on one or more dashboard logical groups, and the repopulated report data may be displayed in a user display device. Then, a graphical representation of the repopulated report data may be generated using a default, or an already selected, color scheme.

Groups available in a dashboard may be determined in a variety of ways, and their selection depends on the implementation. For example, a set of dashboard logic groups may include a group ordered by a file size, a group ordered by a file category, a group ordered by a file extension, a group ordered by a file size and by a file category, a group ordered by a file size and a file extension, and the like.

The example depicted in FIG. 22A shows a visual representation of a group ordered by a file size and by a category 2206 and a visual representation of a group ordered by a files size and by a file extension 2208. Other groups and representations may be generated and displayed for a user.

The example depicted in FIG. 22B shows bar charts depicting a document count per tag 2208. The bar charts include a bar chart 2210 for a count of documents that are associated with a "relevant" tag, and a bar chart 2212 for a count of documents that are associated with a "to be reviewed" tag. The charts graphically represent a document count per the corresponding tags.

In response to receiving a user selection of a second color scheme, a visual representation of the repopulated report data may be automatically updated using the settings associated with the second color schemes. Automatically updated visual representation of the repopulated report data may be displayed on a display of a user display device.

In response to receiving a user selection of a third color scheme, a visual representation of the repopulated report data may be automatically updated using the settings associated with the third color scheme, and the automatically updated visual representation may be displayed for the user. The process of automatically updating the visual representation of the report data may be repeated as many times as the user wishes to do so.

B. Dynamic Update of a File Category Display

In an embodiment, an e-discovery tool provides capabilities for customizing a file category display. Customization may pertain to selecting a color scheme from a plurality of available color scheme to be used to graphically represent the report data organized by a file category.

Figure 23:
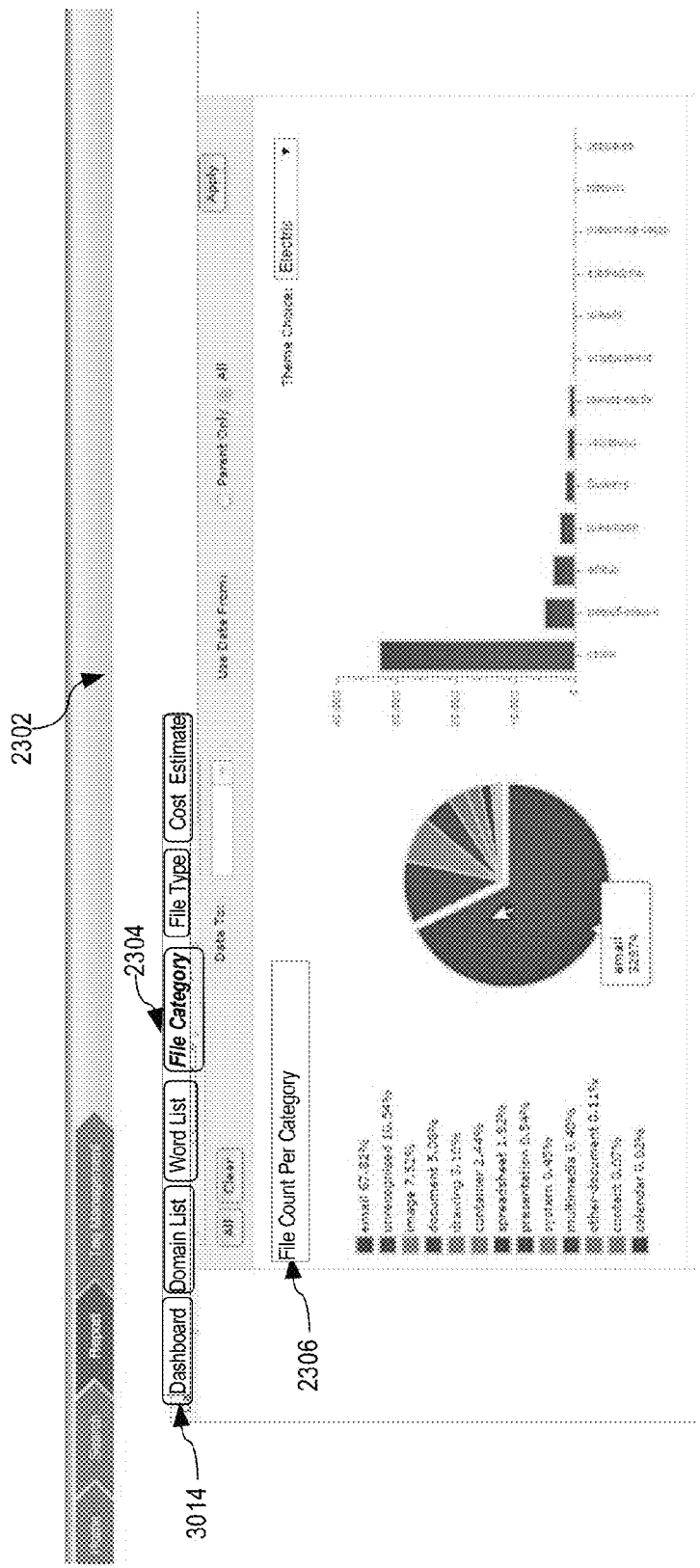
FIG. 23 depicts an example graphical user interface for customizing a file category display.

FIG. 23 depicts an example graphical user interface 2302 for customizing a file category display. Graphical user interface 2302 includes a tab selection set 3014, which includes a file category tab 2304, and other tabs.

In an embodiment, a user selects a tab from tab selection set 3014. In response to determining that a user selected file category tab 2304, report data may be repopulated based on one or more file category groups, and the repopulated report data may be displayed in a user display device. The graphical representation of the repopulated report data may be generated using a default, or an already selected, color scheme. The example depicted in FIG. 23, shows a visual representation of a group ordered by a count and by a category 2306. Other groups and representations may be generated and displayed for a user.

A user may continue selecting different color schemes, and in response to selecting a color scheme, a visual representation of the repopulated report data may be automatically updated. The process of automatically updating the visual representation of the report data may be repeated as many times as needed.

Additional capabilities of customizing visual representations of report data include generating filters for filtering the report data. An example of generating filters is depicted in FIG. 24.

Figure 24:
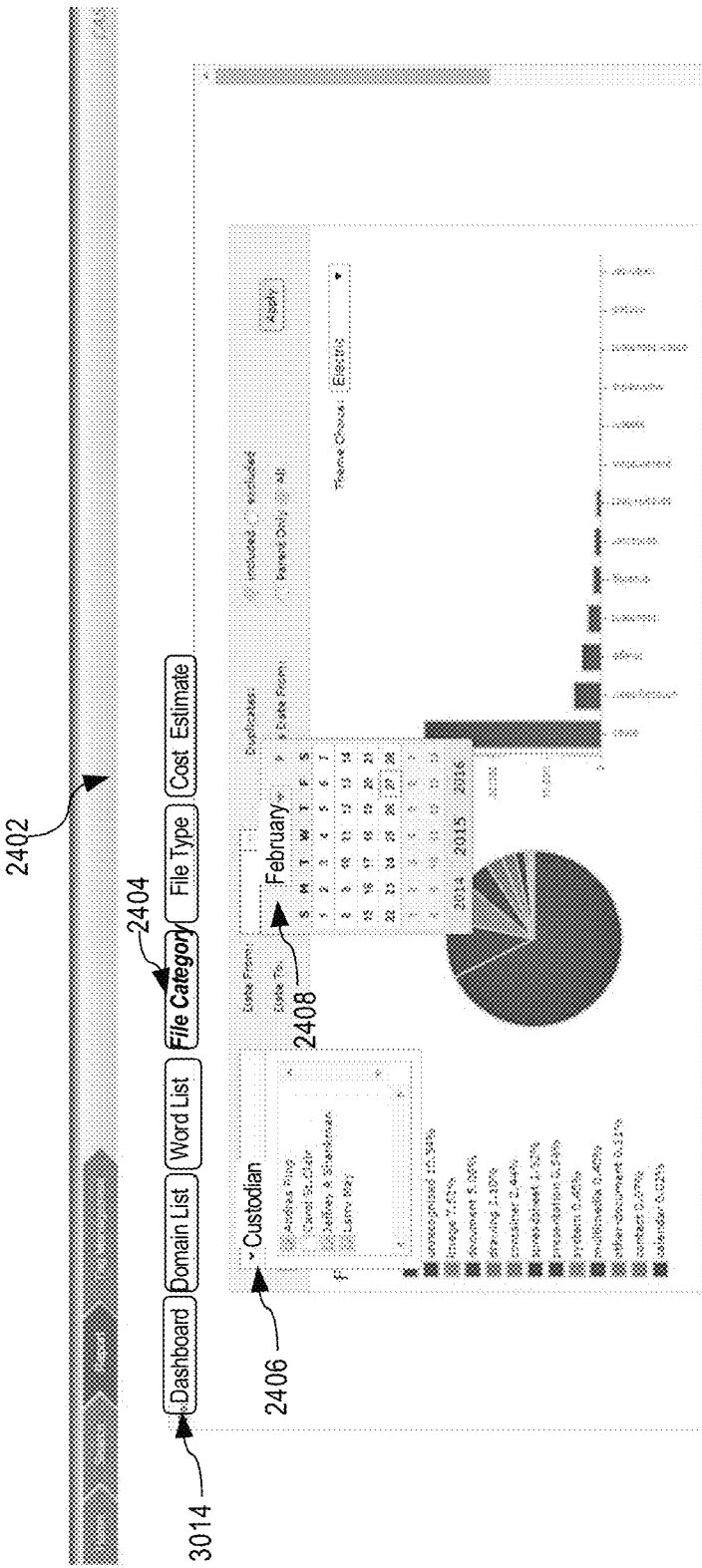
FIG. 24 depicts an example graphical user interface for customizing a file category display.

FIG. 24 depicts an example graphical user interface 2402 for customizing a file category display. Graphical user interface 2402 includes a tab selection set 3014, which includes a file category tab 2404, and other tabs. Suppose that the user selected file category tab 2404.

In response to determining that a user selected file category tab 2404, report data may be repopulated based on one or more file category groups, and the repopulated report data may be displayed in a user display device. The graphical representation of the repopulated report data may be generated using a default, or an already selected, color scheme.

A user may further customize the graphical representation of the report data. For example, a user may filter the report data by requesting that the report data be ordered by a custodian name 2406 who tagged items included in the report data, or by a date 2408 by which the items were tagged or saved. A user may also customize the visual representation of the report data by requesting that the report data by filtered by custodian name 2406, and/or be filtered by a specific time interval, and the like. Other types of filters and customizations are also possible.

D. Dynamic Update of a File Type Display

In an embodiment, an e-discovery tool provides capabilities for customizing a file type display. Customization may pertain to selecting a color scheme from a plurality of available color scheme to be used to graphically represent the report data organized by a file type.

Figure 25:
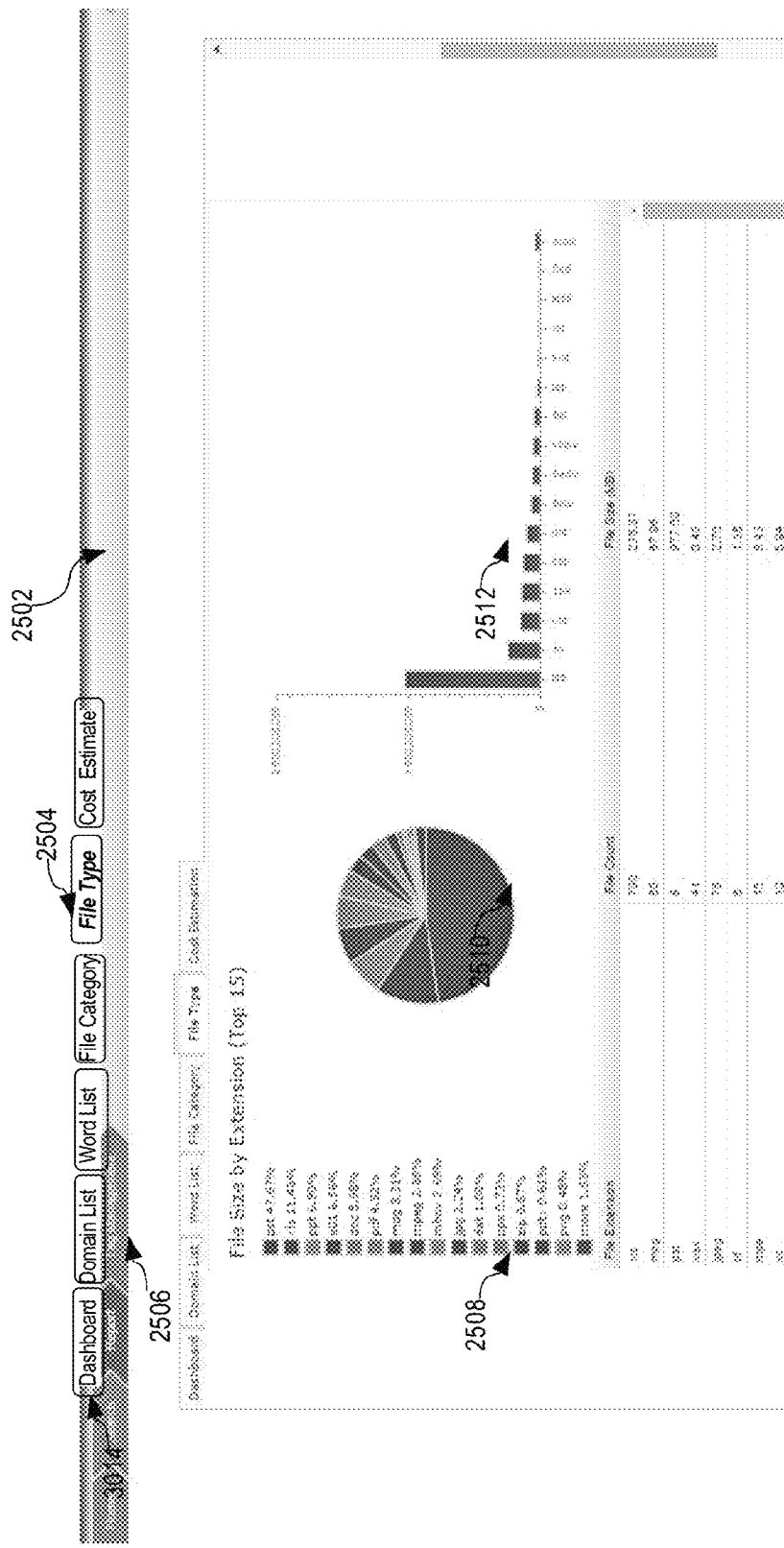
FIG. 25 depicts an example graphical user interface for customizing a file type display.

FIG. 25 depicts an example graphical user interface 2502 for customizing a file type display. Graphical user interface 2502 includes a tab selection set 3014, which includes a file type tab 2504, and other tabs.

In an embodiment, a user selects a tab from tab selection set 3014. In response to determining that a user selected file type tab 2504, report data may be repopulated based on one or more file category groups, and the repopulated report data may be displayed in a user display device. The example depicted in FIG. 25, shows a visual representation of a group ordered by a file size and by a file extension 2506. The example visual representation includes a table including the items organized by the file size and the file extension. The table has three columns: a file extensions column 2508, a file count for each of the file extensions 2510, and a file size for each of the file extensions 2513. Other organizations of the visual representations and other information about the depicted report data may also be implemented.

A user may continue selecting different color schemes, and in response to selecting a color scheme, a visual representation of the repopulated report data may be automatically updated.

Additional capabilities of customizing visual representations of report data include generating filters for filtering the report data. An example of generating filters is depicted in FIG. 26.

Figure 26:
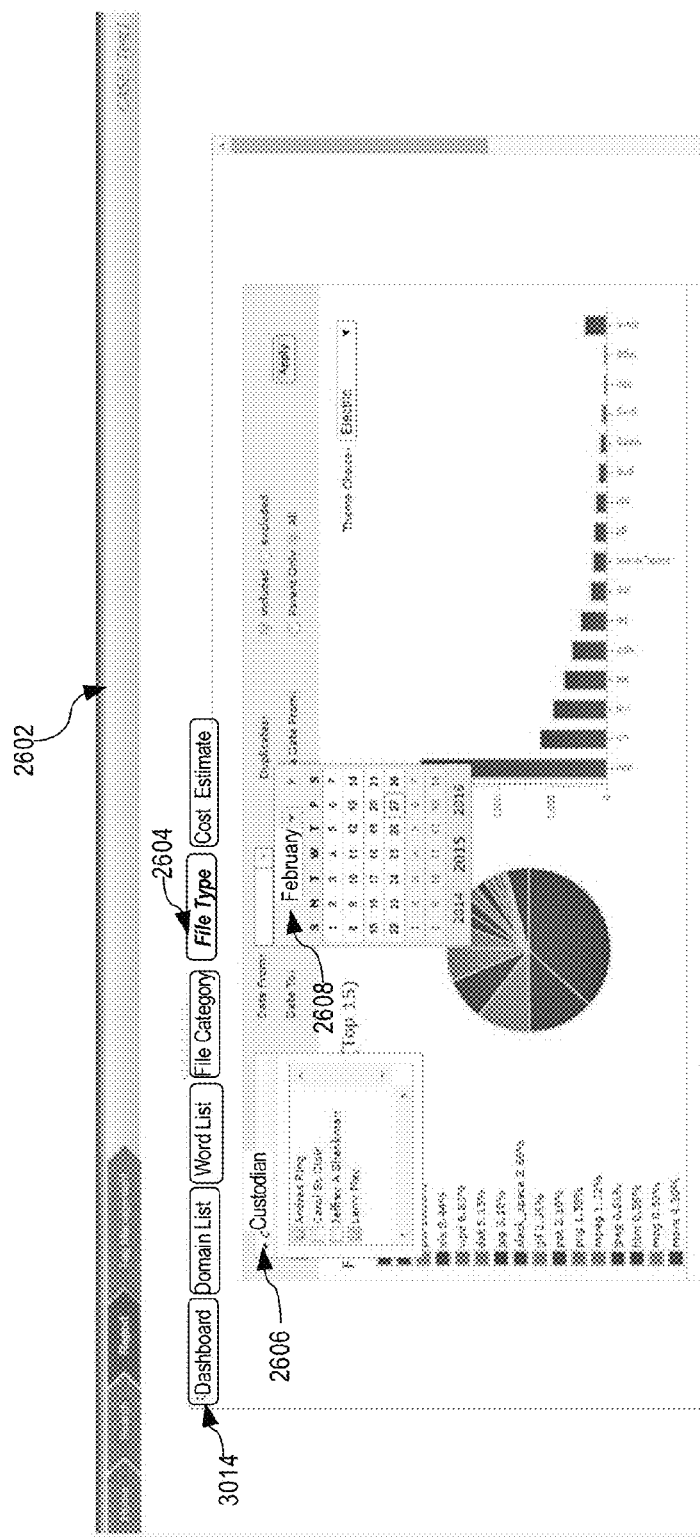
FIG. 26 depicts an example graphical user interface for customizing a file type display.

FIG. 26 depicts an example graphical user interface 2602 for customizing a file type display. Graphical user interface 2602 includes a tab selection set 3014, which includes a file type tab 2604, and other tabs.

Suppose that the user selected file category tab 2604. In response to determining that a user selected file category tab 2604, report data may be repopulated based on one or more file category groups, and the repopulated report data may be displayed in a user display device. The graphical representation of the repopulated report data may be generated using a default, or an already selected, color scheme.

A user may further customize the graphical representation of the report data. For example, a user may filter the report data by requesting that the report data be ordered by a custodian name 2606 who tagged items included in the report data, or by a date 2608 by which the items were tagged or saved. A user may also customize the visual representation of the report data by requesting that the report data by filtered by custodian name 2606, and/or be filtered by a specific time interval, and the like. Other types of filters and customizations are also possible.

E. Dynamic Update of a Domain List Report Display

In an embodiment, an e-discovery tool provides capabilities for customizing a display of a domain list report. Customization may pertain to selecting a color scheme from a plurality of available color scheme to be used to graphically represent the report data organized by a domain name. For example, if a user selects a domain list tag, from the tab set 3014 described above, then report data may be repopulated based one or more domain names, and the repopulated data may be represented using a selected color scheme. A visual representation of the repopulated data may be displayed on a user display device.

A user may also customize various filters for displaying report data. For example, the user may specify the order for displaying domain names and items associated with the domains. Furthermore, a user may specify a time interval for filtering the report data, and the like.

F. Dynamic Update of a Tag Display

In an embodiment, an e-discovery tool provides capabilities for customizing a tag display. Customization may pertain to selecting a color scheme from a plurality of available color scheme to be used to graphically represent the report data, organizing the tags, adding new tags, deleting tags, and the like.

Figure 27:
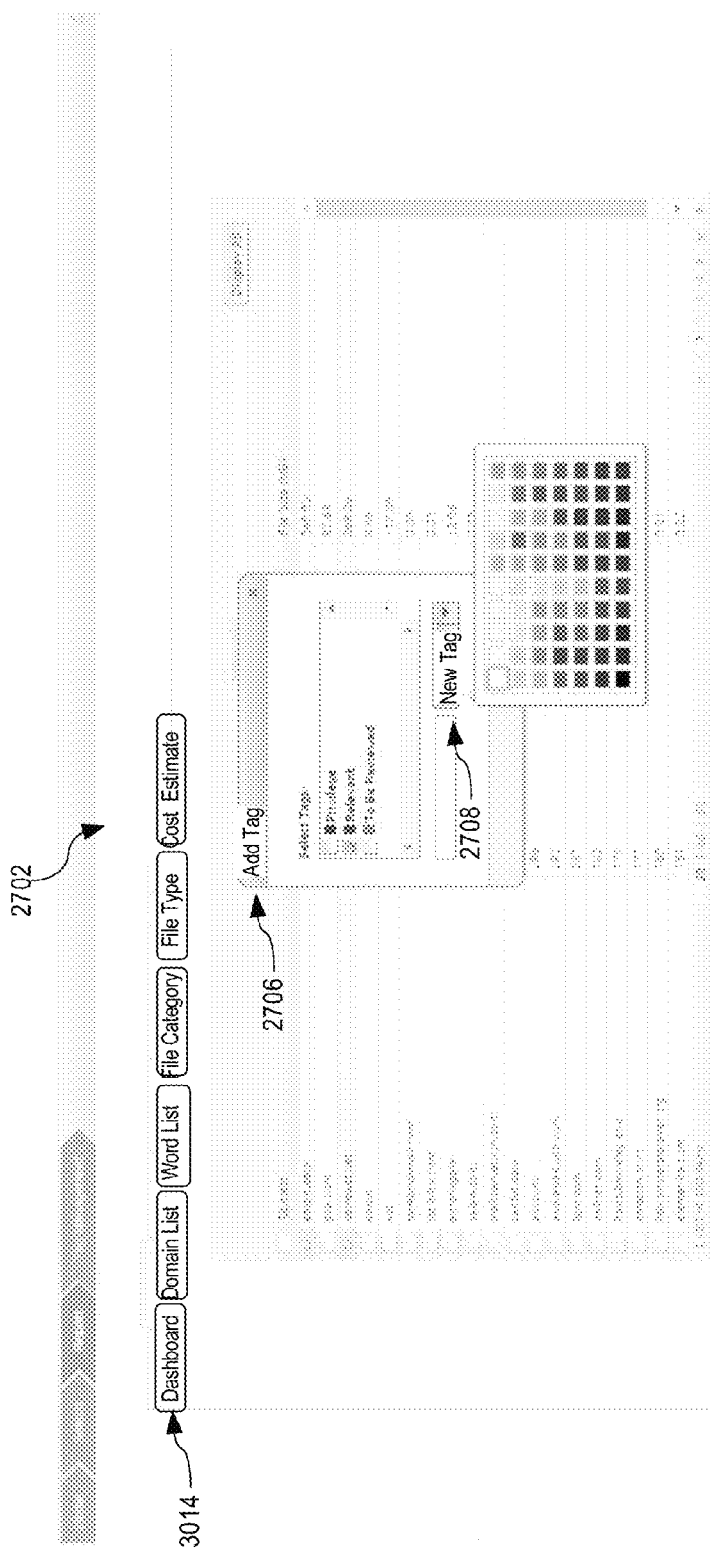
FIG. 27 depicts an example graphical user interface for customizing a tag display.

FIG. 27 depicts an example graphical user interface 2702 for customizing a tag display. Graphical user interface 2702 includes a tab selection set 3014, an add tag object 2706, a new tag object 2708, and other objects.

Add tag object 2706 provides a list of tags that have been already created by users. A user may browse the list of tags, and select one or more tags from the list. Upon selecting one or more tags from the list, a user may request exporting of all items that are associated with the selected tags. Various implementations of export functionalities have been described in FIGS. 10 and 14.

A user may also select new tag object 2708, and thus start a process of creating a new tag. To create a new tag, a user may provide a name of the new tag, select a color for color-coding of the new tag, and specify one or more user who may use the newly created tag. Various implementations of the approach for creating new tags have been described in FIG. 13.

G. Dynamic Update of a Cost Estimator Display

In an embodiment, an e-discovery tool provides capabilities for customizing a cost estimator display. Customization may pertain to selecting tags to be used to filter report data, selecting a number of documents that can be reviewed within an hour, selecting a cost of reviewing the documents per hour, and the like. Customization may also pertain to selecting a color scheme from a plurality of available color scheme to be used to graphically represent the report data organized by a file type.

Figure 28:
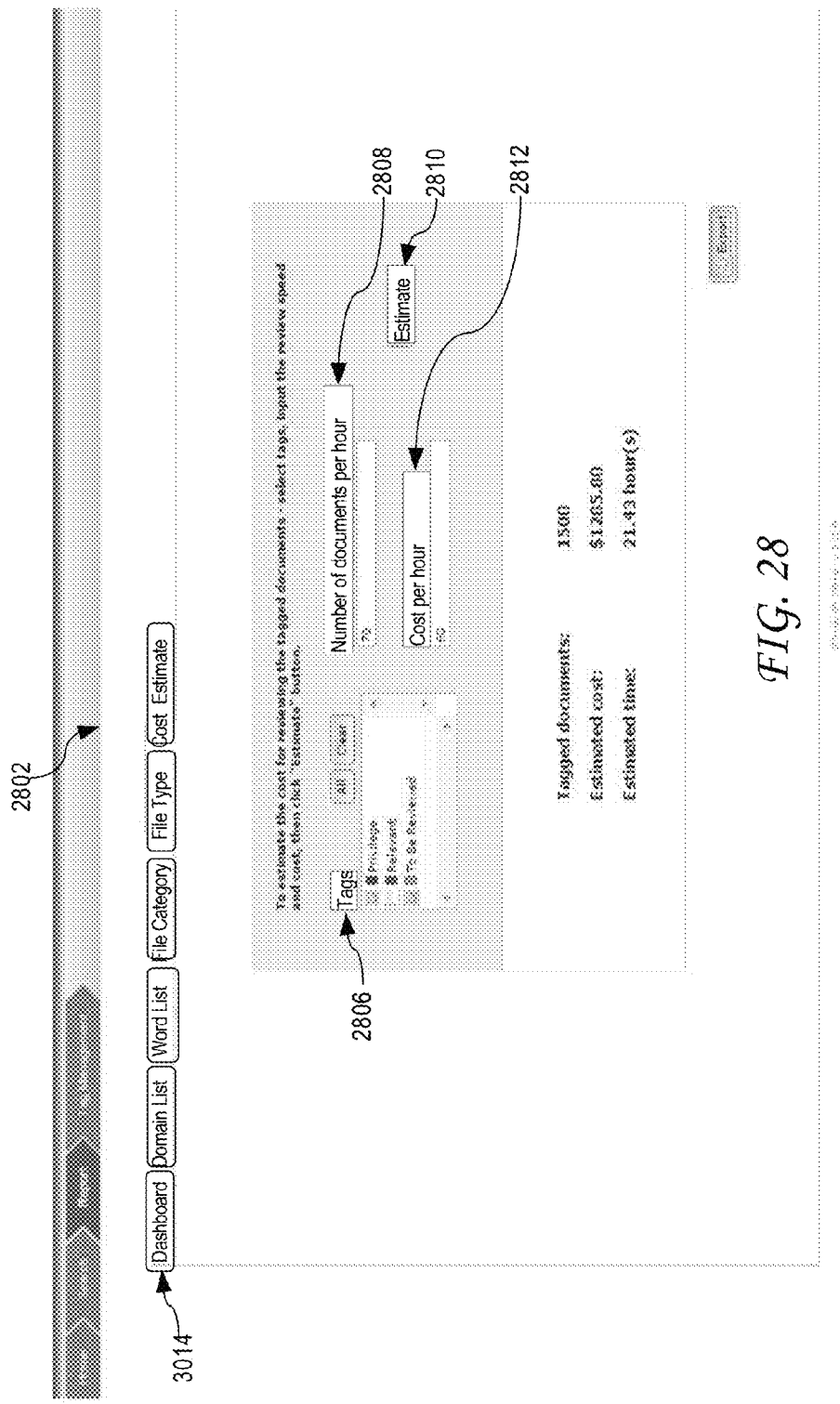
FIG. 28 depicts an example graphical user interface for customizing a cost estimator display.

FIG. 28 depicts an example graphical user interface for customizing a cost estimator display. Graphical user interface 2802 includes a tab selection set 3014, and various objects that allows customizing a cost estimator display. For example, graphical user interface 2802 may include a tags object 2808 for selecting one or more tags to be used to filter report data. Graphical user interface 2802 may also include a number of documents per hour object 2808 for entering a number of documents that reviewers may review per hour, a cost per hour object 2812 for entering a cost of reviewing documents per hour, and an estimate tab 2810 for requesting a cost estimate. In the depicted example, a user selected some tags from tags object 2806, entered "70" into number of documents per hour object 2808, entered "60" into cost per hour object 2812, and selected estimate object 2810. In response, the system displayed that there are 1500 documents tagged with the selected tags, and reviewing of the 1500 documents would take about 21.42 hours, and would cost about $1285.

A user may change parameters of a cost estimator and may change a graphical representation of graphical user interface 2802. Other types of customization of a cost estimator display may also be implemented.

In an embodiment, an e-discovery tool provides a robust tool box that provides intuitive navigation capabilities. For example, the tool provides a separation between features. The features are divided into a group of search features, a group of report features, a group of tag management features, and others. After a user selects a logical data collection, the user may conveniently access each of the separate group of features without a need to repopulate data from the selected data collection. Allowing a user to navigate to one of the separate screens one at the time simplifies the process of navigation through the features, and enhances a user experience. The user does not have to repeat a login process each time the user chooses a different group of features; and at the same time, the separation of the screens presenting different features allows the user to easily identify the available features.

Users may easily access report data from all types of data collections regardless of the sizes and organizations of the collections. Furthermore, the users may easily generate reports based on the data included in the collections. Also, the user may conveniently customize the reports and displays of the reports.

Users may easily tag items included in the collections by for example, tagging a bulk of heterogenic documents such as documents associated with email domains. Users may also customize all types of functionalities of the e-discovery tool according to the users' preferences and liking.

VI. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 29:
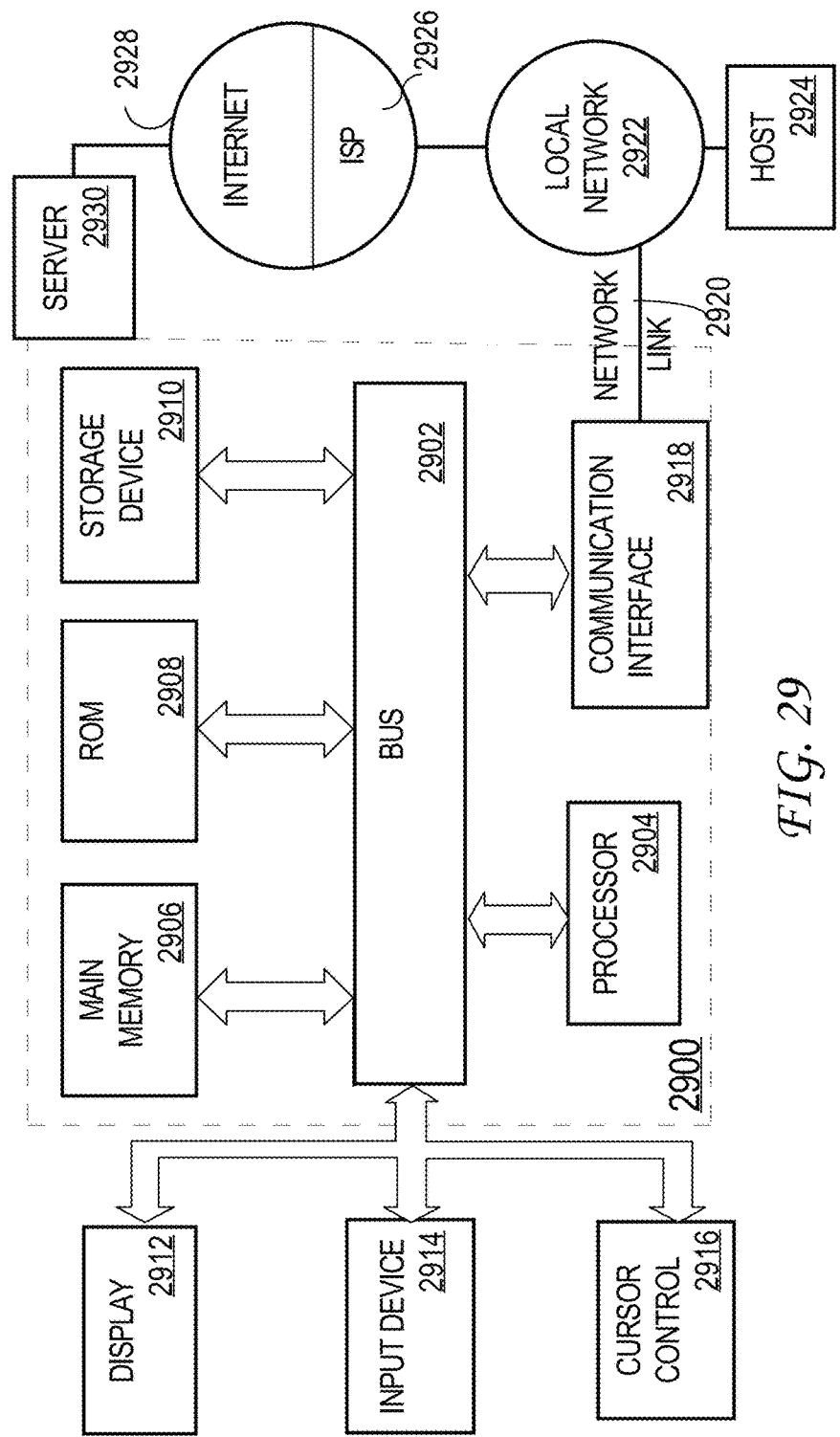
FIG. 29 is a block diagram of a computer system on which embodiments may be implemented.

FIG. 29 is a block diagram that depicts an example computer system 2900 upon which embodiments may be implemented. Computer system 2900 includes a bus 2902 or other communication mechanism for communicating information, and a processor 2904 coupled with bus 2902 for processing information. Computer system 2900 also includes a main memory 2906, such as a random access memory (RAM) or other dynamic storage device, coupled to bus 2902 for storing information and instructions to be executed by processor 2904. Main memory 2906 also may be used for storing temporary variables or other intermediate information during execution of instructions to be executed by processor 2904. Computer system 2900 further includes a read only memory (ROM) 2908 or other static storage device coupled to bus 2902 for storing static information and instructions for processor 2904. A storage device 2910, such as a magnetic disk or optical disk, is provided and coupled to bus 2902 for storing information and instructions.

Computer system 2900 may be coupled via bus 2902 to a display 2912, such as a cathode ray tube (CRT), for displaying information to a computer user. Although bus 2902 is illustrated as a single bus, bus 2902 may comprise one or more buses. For example, bus 2902 may include without limitation a control bus by which processor 2904 controls other devices within computer system 2900, an address bus by which processor 2904 specifies memory locations of instructions for execution, or any other type of bus for transferring data or signals between components of computer system 2900.

An input device 2914, including alphanumeric and other keys, is coupled to bus 2902 for communicating information and command selections to processor 2904. Another type of user input device is cursor control 2916, such as a mouse, a trackball, or cursor direction keys for communicating direction information and command selections to processor 2904 and for controlling cursor movement on display 2912. This input device typically has two degrees of freedom in two axes, a first axis (e.g., x) and a second axis (e.g., y), that allows the device to specify positions in a plane.

Computer system 2900 may implement the techniques described herein using customized hard-wired logic, one or more ASICs or FPGAs, firmware and/or program logic or computer software which, in combination with the computer system, causes or programs computer system 2900 to be a special-purpose machine. According to one embodiment, those techniques are performed by computer system 2900 in response to processor 2904 executing one or more sequences of one or more instructions contained in main memory 2906. Such instructions may be read into main memory 2906 from another computer-readable medium, such as storage device 2910. Execution of the sequences of instructions contained in main memory 2906 causes processor 2904 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 2900, various computer-readable media are involved, for example, in providing instructions to processor 2904 for execution. Such a medium may take many forms, including but not limited to, non-volatile media and volatile media. Non-volatile media includes, for example, optical or magnetic disks, such as storage device 2910. Volatile media includes dynamic memory, such as main memory 2906. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 2904 for execution. For example, the instructions may initially be carried on a magnetic disk of a remote computer. The remote computer can load the instructions into its dynamic memory and send the instructions over a telephone line using a modem. A modem local to computer system 2900 can receive the data on the telephone line and use an infra-red transmitter to convert the data to an infra-red signal. An infra-red detector can receive the data carried in the infra-red signal and appropriate circuitry can place the data on bus 2902. Bus 2902 carries the data to main memory 2906, from which processor 2904 retrieves and executes the instructions. The instructions received by main memory 2906 may optionally be stored on storage device 2910 either before or after execution by processor 2904.

Computer system 2900 also includes a communication interface 2918 coupled to bus 2902. Communication interface 2918 provides a two-way data communication coupling to a network link 2920 that is connected to a local network 2922. For example, communication interface 2918 may be an integrated services digital network (ISDN) card or a modem to provide a data communication connection to a corresponding type of telephone line. As another example, communication interface 2918 may be a local area network (LAN) card to provide a data communication connection to a compatible LAN. Wireless links may also be implemented. In any such implementation, communication interface 2918 sends and receives electrical, electromagnetic or optical signals that carry digital data streams representing various types of information.

Network link 2920 typically provides data communication through one or more networks to other data devices. For example, network link 2920 may provide a connection through local network 2922 to a host computer 2924 or to data equipment operated by an Internet Service Provider (ISP) 2926. ISP 2926 in turn provides data communication services through the world wide packet data communication network now commonly referred to as the "Internet" 2928.

Local network 2922 and Internet 2928 both use electrical, electromagnetic or optical signals that carry digital data streams.

Computer system 2900 can send messages and receive data, including program code, through the network(s), network link 2920 and communication interface 2918. In the Internet example, a server 2930 might transmit a requested code for an application program through Internet 2928, ISP 2926, local network 2922 and communication interface 2918. The received code may be executed by processor 2904 as it is received, and/or stored in storage device 2910, or other non-volatile storage for later execution.

In the foregoing specification, embodiments have been described with reference to numerous specific details that may vary from implementation to implementation. Thus, the sole and exclusive indicator of what is, and is intended by the applicants to be, the approach is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable storage media for providing an improvement in searching, reporting and tagging services that are implemented in electronic discovery insight tools, the one or more non-transitory computer-readable media, the computer-readable storage media storing instructions which, when processed by one or more processors, cause the one or more processors to perform:

prior to searching, reporting or tagging any data collection:
displaying on a user display device:
an interactive object for selecting a data collection from a plurality of data collections,
a selectable search object icon for selecting search functionalities that are customizable for each data collection selected from the plurality of data collections,
a selectable report object icon for selecting report functionalities that are customizable for each data collection selected from the plurality of data collections, and
a selectable tag management object icon for selecting tag management functionalities that are customizable for each data collection selected from the plurality of data collections;
prior to searching, reporting or tagging any data collection: receiving, from a user via the interactive object, a selection of a particular data collection from the plurality of data collections;
prior to searching, reporting or tagging any data collection: in response to receiving the selection of the particular data collection:
accessing the selected particular data collection;
generating customized search functionalities by modifying a search interface based on the selected particular data collection, wherein the customized search functionalities are distinct from customizations for other data collections from the plurality of data collections,
generating customized report functionalities by modifying a report interface based on the selected particular data collection, wherein the customized report functionalities are distinct from customizations for other data collections from the plurality of data collections,
generating customized tag management functionalities by modifying a tag interface based on the selected particular data collection, wherein the customized tag management functionalities are distinct from customizations for other data collections from the plurality of data collections, and
making the customized search functionalities, the customized report functionalities, or the customized tag management functionalities available for selection when the user selects the selectable search object icon, the selectable report object icon, or the selectable tag management object icon, respectively;
receiving a request for searching, reporting or tagging the particular data collection;
in response to receiving the request for searching, reporting or tagging the particular data collection:
providing the customized search functionalities that are customized for searching the particular data collection,
providing the customized report functionalities that are customized for reporting the particular data collection, or
providing the customized tag management functionalities that are customized for tagging the particular data collection.

2. The one or more non-transitory computer-readable storage media of claim 1, wherein the selected particular data collection is one of data collections that comprise one or more logical data collections, each logical data collection associated with one or more of: a database, a case, a project, or report data.

3. The one or more non-transitory computer-readable storage media of claim 1, storing additional instructions which, when processed by one or more processors, cause:
in response to receiving the selection of the data collection:
receiving, from the user, a selection of the selectable search object icon for selecting the search functionalities;
in response to receiving the selection of the selectable search object icon:
generating and customizing a search menu for providing the search functionalities for performing one or more searches on data included in the data collection; and
displaying the search menu on the user display device.

4. The one or more non-transitory computer-readable storage media of claim 1, storing additional instructions which, when processed by one or more processors, cause:
in response to receiving the selection of the data collection:
receiving, from the user, a selection of the selectable report object icon for selecting the report functionalities;
in response to receiving the selection of the selectable report object icon:
generating and customizing a report menu providing the report functionalities for generating one or more reports based on data included in the data collection; and
displaying the report menu on the user display device.

5. The one or more non-transitory computer-readable storage media of claim 1, storing additional instructions which, when processed by one or more processors, cause:
in response to receiving the selection of the data collection:
receiving, from the user, a selection of the selectable tag management object icon for selecting the tag management functionalities;
in response to receiving the selection of the selectable tag management object icon:
generating and customizing a tag management menu providing the tag management functionalities for performing one or more tag management functions on data included in the data collection; and
displaying the tag management menu on the display of the user display device.

6. The one or more non-transitory computer-readable storage media of claim 1, comprising additional instructions which, when executed, cause:
prior to displaying the interactive object, the selectable search object icon, the selectable report object icon, and the selectable tag management object icon:
displaying, on the user display device, a user input credential object for providing user credentials;
receiving, from the user via the user input credential object, particular user credentials;
determining whether the particular user credentials are valid and correspond to administrator credentials;
in response to determining that the particular user credentials are valid and correspond to the administrator credentials, customizing the search functionalities, the report functionalities and the tag management functionalities based on the administrator credentials.

7. The one or more non-transitory computer-readable storage media of claim 6, comprising additional instructions which, when executed, cause:
determining whether the particular user credentials are valid and correspond to client credentials;
in response to determining that the particular user credentials are valid and correspond to the client credentials, customizing the search functionalities, the report functionalities and the tag management functionalities based on the client credentials.

8. An apparatus for providing an improvement in searching, reporting and tagging services that are implemented in electronic discovery insight tools, the apparatus comprising:
one or more processors; and
one or more memories communicatively coupled to the one or more processors and storing instructions which, when processed by the one or more processors, cause:
a discovery manager configured to perform:
prior to searching, reporting or tagging data collection:
displaying on a user display device:
an interactive object for selecting a data collection from a plurality of data collections,
a selectable search object icon for selecting search functionalities that are customizable for each data collection selected from the plurality of data collections,
a selectable report object icon for selecting report functionalities that are customizable for each data collection selected from the plurality of data collections, and
a selectable tag management object icon for selecting tag management functionalities that are customizable for each data collection selected from the plurality of data collections;
prior to searching, reporting or tagging any data collection:
receiving, from a user via the interactive object, a selection of a particular data collection from the plurality of data collections;
prior to searching, reporting or tagging any data collection:
in response to receiving the selection of the particular data collection:
accessing the selected particular data collection;
generating customized search functionalities by modifying a search interface based on the selected particular data collection, wherein the customized search functionalities are distinct from customizations for other data collections from the plurality of data collections,
generating customized report functionalities by modifying a report interface based on the selected particular data collection, wherein the customized report functionalities are distinct from customizations for other data collections from the plurality of data collections,
generating customized tag management functionalities by modifying a tag interface based on the selected particular data collection, wherein the customized tag management functionalities are distinct from customizations for other data collections from the plurality of data collections, and
making the customized search functionalities, the customized report functionalities, or the customized tag management functionalities available for selection when the user selects the selectable search object icon, the selectable report object icon, or the selectable tag management object icon, respectively;
receiving a request for searching, reporting or tagging the particular data collection;
in response to receiving the request for searching, reporting or tagging the particular data collection:
providing the customized search functionalities that are customized for searching the particular data collection,
providing the customized report functionalities that are customized for reporting the particular data collection, or
providing the customized tag management functionalities that are customized for tagging the particular data collection.

9. The apparatus of claim 8, wherein the selected particular data collection is one of data collections that comprise one or more logical data collections, each logical data collection associated with one or more of: a database, a case, a project, or report data.

10. The apparatus of claim 8, wherein the discovery manager is further configured to perform:
in response to receiving the selection of the data collection:
receiving, from the user, a selection of the selectable search object icon for selecting the search functionalities;
in response to receiving the selection of the selectable search object icon:
generating and customizing a search menu for providing the search functionalities for performing one or more searches on data included in the data collection; and
displaying the search menu on the user display device.

11. The apparatus of claim 8, wherein the discovery manager is further configured to perform:
 in response to receiving the selection of the data collection:
  receiving, from the user, a selection of the selectable report object icon for selecting the report functionalities;
  in response to receiving the selection of the selectable report object icon:
   generating and customizing a report menu providing the report functionalities for generating one or more reports based on data included in the data collection; and
   displaying the report menu on the user display device.

12. The apparatus of claim 8, wherein the discovery manager is further configured to perform:
 in response to receiving the selection of the data collection:
  receiving, from the user, a selection of the selectable tag management object icon for selecting the tag management functionalities;
  in response to receiving the selection of the selectable tag management object icon:
   generating and customizing a tag management menu providing the tag management functionalities for performing one or more tag management functions on data included in the data collection; and
   displaying the tag management menu on the display of the user display device.

13. The apparatus of claim 8, wherein the discovery manager is further configured to perform:
 prior to displaying the interactive object, the selectable search object icon, the selectable report object icon, and the selectable tag management object icon:
  displaying, on the user display device, a user input credential object for providing user credentials;
  receiving, from the user via the user input credential object, particular user credentials;
  determining whether the particular user credentials are valid and correspond to administrator credentials;
  in response to determining that the particular user credentials are valid and correspond to the administrator credentials, customizing the search functionalities, the report functionalities and the tag management functionalities based on the administrator credentials.

14. The apparatus of claim 13, wherein the discovery manager is further configured to perform:
 determining whether the particular user credentials are valid and correspond to client credentials;
 in response to determining that the particular user credentials are valid and correspond to the client credentials, customizing the search functionalities, the report functionalities and the tag management functionalities based on the client credentials.

15. A method for improving a computer system to perform advanced customization of searching, reporting and tagging services and for improving user portals supporting accessing, generating and customizing data reports, the method comprising:
 prior to searching, reporting or tagging any data collection:
  displaying on a user display device:
   an interactive object for selecting a data collection from a plurality of data collections,
   a selectable search object icon for selecting search functionalities that are customizable for each data collection selected from the plurality of data collections,
   a selectable report object icon for selecting report functionalities that are customizable for each data collection selected from the plurality of data collections, and
   a selectable tag management object icon for selecting tag management functionalities that are customizable for each data collection selected from the plurality of data collections;
 prior to searching, reporting or tagging any data collection: receiving, from a user via the interactive object, a selection of a particular data collection from the plurality of data collections;
 prior to searching, reporting or tagging any data collection: in response to receiving the selection of the particular data collection:
  accessing the selected particular data collection;
  generating customized search functionalities by modifying a search interface based on the selected particular data collection, wherein the customized search functionalities are distinct from customizations for other data collections from the plurality of data collections,
  generating customized report functionalities by modifying a report interface based on the selected particular data collection, wherein the customized report functionalities are distinct from customizations for other data collections from the plurality of data collections,
  generating customized tag management functionalities by modifying a tag interface based on the selected particular data collection, wherein the customized tag management functionalities are distinct from customizations for other data collections from the plurality of data collections, and
  making the customized search functionalities, the customized report functionalities, or the customized tag management functionalities available for selection when the user selects the selectable search object icon, the selectable report object icon, or the selectable tag management object icon, respectively;
 receiving a request for searching, reporting or tagging the particular data collection;
 in response to receiving the request for searching, reporting or tagging the particular data collection:
  providing the customized search functionalities that are customized for searching the particular data collection,
  providing the customized report functionalities that are customized for reporting the particular data collection, or
  providing the customized tag management functionalities that are customized for tagging the particular data collection.

16. The method of claim 15, wherein the selected particular data collection is one of data collections that comprise one or more logical data collections, each logical data collection associated with one or more of: a database, a case, a project, or report data.

17. The method of claim 15, further comprising:
 in response to receiving the selection of the data collection:

receiving, from the user, a selection of the selectable search object icon for selecting the search functionalities;

in response to receiving the selection of the selectable search object icon:

generating and customizing a search menu for providing the search functionalities for performing one or more searches on data included in the data collection; and displaying the search menu on the user display device.

18. The method of claim 15, further comprising:

in response to receiving the selection of the data collection:

receiving, from the user, a selection of the selectable report object icon for selecting the report functionalities;

in response to receiving the selection of the selectable report object icon:

generating and customizing a report menu providing the report functionalities for generating one or more reports based on data included in the data collection; and displaying the report menu on the user display device.

19. The method of claim 15, further comprising:

in response to receiving the selection of the data collection:

receiving, from the user, a selection of the selectable tag management object icon for selecting the tag management functionalities;

in response to receiving the selection of the selectable tag management object icon:

generating and customizing a tag management menu providing the tag management functionalities for performing one or more tag management functions on data included in the data collection; and displaying the tag management menu on the display of the user display device.

20. The method of claim 15, further comprising:

prior to displaying the interactive object, the selectable search object icon, the selectable report object icon, and the selectable tag management object icon:

displaying, on the user display device, a user input credential object for providing user credentials;

receiving, from the user via the user input credential object, particular user credentials;

determining whether the particular user credentials are valid and correspond to administrator credentials;

in response to determining that the particular user credentials are valid and correspond to the administrator credentials, customizing the search functionalities, the report functionalities and the tag management functionalities based on the administrator credentials.

* * * * *